United States Patent
You et al.

(10) Patent No.: US 10,856,277 B2
(45) Date of Patent: Dec. 1, 2020

(54) METHOD FOR RECEIVING INFORMATION BY MTC DEVICE LOCATED IN CELL COVERAGE-EXPANDED AREA

(71) Applicant: LG ELECTRONICS INC., Seoul (KR)

(72) Inventors: Hyangsun You, Seoul (KR); Dongyoun Seo, Seoul (KR); Yunjung Yi, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 14/888,893

(22) PCT Filed: May 9, 2014

(86) PCT No.: PCT/KR2014/004132
§ 371 (c)(1),
(2) Date: Nov. 3, 2015

(87) PCT Pub. No.: WO2014/185660
PCT Pub. Date: Nov. 20, 2014

(65) Prior Publication Data
US 2016/0119900 A1    Apr. 28, 2016

Related U.S. Application Data

(60) Provisional application No. 61/822,418, filed on May 12, 2013, provisional application No. 61/858,627, (Continued)

(51) Int. Cl.
H04W 72/04    (2009.01)
H04W 4/70    (2018.01)
(Continued)

(52) U.S. Cl.
CPC ......... H04W 72/042 (2013.01); H04L 5/0053 (2013.01); H04L 5/0094 (2013.01);
(Continued)

(58) Field of Classification Search
CPC ............... H04W 72/042; H04W 4/005; H04W 72/0446; H04W 74/04; H04L 5/0053; H04L 5/0094
See application file for complete search history.

(56) References Cited

U.S. PATENT DOCUMENTS

2012/0155404 A1    6/2012    Shin et al.
2012/0282965 A1    11/2012   Kim et al.
(Continued)

FOREIGN PATENT DOCUMENTS

CN    102792611 A    11/2012
CN    102823176 A    12/2012
(Continued)

OTHER PUBLICATIONS

Motorola Mobility 3GPP TSG-RAN WG1 meeting #73 R1-132467 Further considerations on MTC coverage enhancement. (Year: 2013).*
(Continued)

Primary Examiner — Jeffrey M Rutkowski
Assistant Examiner — Basil Ma
(74) Attorney, Agent, or Firm — Birch, Stewart, Kolasch & Birch, LLP

(57) ABSTRACT

According to one discourse of the present specification, a method for receiving information by a machine type communication (MTC) device is provided. The method of receiving the information may comprise the steps of: monitoring cell-specific control information within a common search space; and monitoring MTC device-specific control information within a UE-specific search space. Here, a
(Continued)

resource region in which the common search space (CSS) is located and a resource region in which the UE-specific search space (USS) is located may be configured not to overlap each other.

16 Claims, 26 Drawing Sheets

Related U.S. Application Data filed on Jul. 26, 2013, provisional application No. 61/862,519, filed on Aug. 6, 2013, provisional application No. 61/897,801, filed on Oct. 30, 2013, provisional application No. 61/916,283, filed on Dec. 15, 2013.

(51) Int. Cl.
  *H04L 5/00* (2006.01)
  *H04W 74/00* (2009.01)
  *H04W 74/04* (2009.01)

(52) U.S. Cl.
  CPC ......... *H04W 4/70* (2018.02); *H04W 72/0446* (2013.01); *H04W 74/006* (2013.01); *H04W 74/04* (2013.01); *H04L 5/0033* (2013.01)

(56) References Cited

U.S. PATENT DOCUMENTS

| | | | |
|---|---|---|---|
| 2012/0327894 A1 | 12/2012 | Axmon et al. | |
| 2012/0327895 A1 | 12/2012 | Wallén et al. | |
| 2013/0003639 A1* | 1/2013 | Noh | H04L 5/0053 370/312 |
| 2013/0083753 A1* | 4/2013 | Lee | H04W 72/0453 370/329 |
| 2013/0094457 A1 | 4/2013 | Seo et al. | |
| 2013/0136098 A1* | 5/2013 | Li | H04W 72/042 370/330 |
| 2014/0098761 A1* | 4/2014 | Lee | H04W 24/02 370/329 |
| 2014/0341141 A1 | 11/2014 | Nguyen et al. | |

FOREIGN PATENT DOCUMENTS

| | | |
|---|---|---|
| CN | 102958025 A | 3/2013 |
| CN | 103052139 A | 4/2013 |
| KR | 10-2013-0040699 A | 4/2013 |
| WO | WO 2011/083997 A2 | 7/2011 |
| WO | WO 2011/120007 A1 | 9/2011 |
| WO | WO 2012/173432 A2 | 12/2012 |
| WO | WO 2013/019088 A2 | 2/2013 |
| WO | WO 2013/066083 A2 | 5/2013 |

OTHER PUBLICATIONS

LG 3GPP TSG-RAN WG1 meeting #72bis R1-131294 Text Proposal for coverage enhancement of MTC UEs (Year: 2013).*
LG 3GPP TSG RAN WG1 meeting #72 R1-130263 Cell Acquisition and Reference Signals for Coverage Limiting MTC UEs (Year: 2013).*
Alcatel-Lucent 3GPP TSG-RAN WG1 Meeting #72bis R1-130941 (E)PDCCH coverage extension for MTC devices (Year: 2013).*
Alcatel-Lucent et al., "(E)PDCCH coverage extension for MTC devices," 3GPP TSG-RAN WG1 Meeting #72bis, R1-130941, Chicago, USA, Apr. 15-19, 2013, 4 pages.
Catt, "Design of E-PDCCH search space," 3GPP TSG RAN WG1 Meeting #67, R1-113743, San Francisco, USA, Nov. 14-18, 2011, 3 pages.
Fujitsu, "UE-specific search space location offset across DL component carriers," 3GPP TSG-RAN1 #61, R1-103217, Montreal, Canada, May 10-14, 2010, pp. 1/2-2/2.
LG Electronics, "Cell Acquisition and Reference Signals for Coverage Limiting MTC UEs," 3GPP TSG RAN WG1 #72, R1-130263, St. Julian's, Malta, Jan. 28-Feb. 1, 2013, 7 pages.
LG Electronics, "Issue on handling of search space collision in case of cross-carrier scheduling," 3GPP TSG RAN WG1 #60bis, R1-102411, Beijing, China, Apr. 12-16, 2010, 5 pages.
LG Electronics, "On the Necessity of Common Search Space on E-PDCCH," 3GPP TSG RAN WG1 Meeting #68bis, R1-121454, Jeju, Korea, Mar. 26-30, 2012, pp. 1-4.
LG Electronics, "PBCH and SIB Enhancement for Coverage-limiting UEs," 3GPP TSG RAN WG1 Meeting #72bis, R1-131296, Chicago, Apr. 15-19, 2013, 4 pages.
LG Electronics, "Text proposal for coverage enhancement of MTC UEs", R1-131294, 3GPP TSG RAN WG1 Meeting #72bis, Chicago, USA, Apr. 15-19, 2013, 7 pages.
LG Electronics, "Text Proposal on Coverage Enhancement for a MTC UE," R1-130264, 3GPP TSG RAN WG1 #72, St Julian's, Malta, Jan. 28-Feb. 1, 2013 (retrieved on Jan. 18, 2013), 7 pages.
Ericsson et al., "Impact of M-RNTI on PDCCH and on UE battery consumption," 3GPP TSG RAN WG2 #67, R2-094506, Shenzhen, China, Aug. 24-28, 2009, 6 pages.
Motorola Mobility, "Support for Common Search Space for EPDCCH," 3GPP TSG RAN WG1 #68bis, R1-121585, Jeju, Korea, Mar. 26-30, 2012, 3 pages.
ZTE, "SPS and TTI bundling," 3GPP TSG RAN WG2 #63bis, Tdoc R2-085338, Prague, Czech Republic, Sep. 29-Oct. 3, 2008, 3 pages.

\* cited by examiner (b) MULTIPLE CCS (a) SINGLE CC

METHOD FOR RECEIVING INFORMATION BY MTC DEVICE LOCATED IN CELL COVERAGE-EXPANDED AREA

CROSS REFERENCE TO RELATED APPLICATIONS

This application is the National Phase of PCT International Application No. PCT/KR2014/004132, filed on May 9, 2014, which claims priority under 35 U.S.C. 119(e) to U.S. Provisional Application Nos. 61/822,418, 61/858,627, 61/862,519, 61/897,801, and 61/916,283, filed on May 12, 2013, Jul. 26, 2013, Aug. 6, 2013, Oct. 30, 2013, and Dec. 15, 2013 respectively, all of which are hereby expressly incorporated by reference into the resent application.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, research into communication between devices or the device and a server without human interaction, that is, without human intervention, that is, machine type communication (MTC) has been actively conducted. The MTC represents a concept in which not a terminal used by human but a machine performs communication by using the existing wireless communication network.

Since a characteristic of the MTC is different from that of a general terminal, a service optimized for the MTC may be different from a service optimized for human to human communication. The MTC communication may be characterized as different market scenarios, data communication, small cost and little effort, potentially very many MTC device, a wide service area, and low traffic per MTC device as compared with a current mobile network communication service.

In recent years, expanding cell coverage has been considered for the MTC device and various techniques for expanding the cell coverage has been discussed. However, in the case where the coverage of the cell is expanded, when the base station transmits system information as transmitting the system information to general UE, the MTC device located in a cell coverage expanded area has a difficulty in receiving the system information.

Further, it is anticipated that the MTC device has low performance in order to increase a penetration rate at lost coast and when blind-decoding two or more control information is attempted in one subframe like a general terminal, decoding success cannot be secured.

SUMMARY OF THE INVENTION

Accordingly, the present invention has been made in an effort to solve the problem.

In order to achieve the object, in detail, when a machine type communication (MTC) device is located in a coverage expanded area of a base station, the MTC device repeatedly receives system information (e.g., a first type system information block (SIB)) on multiple subframes and thereafter, combines and decodes the repeatedly received system information.

Further, when two or more control information is present in one subframe, the MTC device decodes only any one to thereby increase a decoding success rate.

In more detail, according to one disclosure of the present invention, there is provided a method for receiving information by a machine type communication (MTC) device. The method may comprise: monitoring cell-specific control information within a common search space; and monitoring MTC device-specific control information within a UE-specific search space. a resource region in which the common search space (CSS) is located and a resource region in which the UE-specific search space (USS) is located are configured not to overlap each other.

The resource region may be a subframe unit.

The resource region may be any one of a control channel element (CCE) unit, a resource element group (REG) unit, and a resource element (RE) unit.

According to one disclosure of the present invention, there is also provided a method for receiving information by a machine type communication (MTC) device. The method may comprise: determining a common search space (CSS) where cell-specific control information is to be monitored; determining a UE specific search space (USS) where UE-specific control information is to be monitored; and selectively monitoring only any one search space when all or some of radio resources of the common search space (CSS) and radio resources of the UE-specific search space (USS) overlap with each other.

The monitoring may include: prioritizing the common search space (CSS) to the UE-specific search space (USS), and monitoring the cell-specific control information within the common search space.

The monitoring may include: prioritizing the UE-specific search space (USS) to the common search space (CSS), and monitoring the UE-specific control information within the UE-specific search space (USS).

Control information within a search space other than a search space selected to be monitored may be punctured on the radio resource.

In the monitoring, when a PDCCH masked with a system information-radio network temporary identifier (SI-RNTI) is present in the radio resource, only the common search space (CSS) may be monitored on the radio resource.

On the other hand, according to one disclosure of the present invention, there is provided a machine type communication (MTC) device. The MTC device may include: a processor configured to determine a common search space (CSS) where cell-specific control information is to be monitored and determine a UE-specific search space (USS) where UE-specific control information is to be monitored; and a transceiving unit configured to selectively monitor only any one search space when all or some of radio resources of the common search space (CSS) and radio resources of the UE-specific search space (USS) overlap with each other.

According to the disclosure of the specification, the problem in the related art is solved. In more detail, when a machine type communication (MTC) device is located in a coverage expanded area of a base station, the MTC device repeatedly receives system information (e.g., a first type system information block) on multiple subframes and thereafter, combines and decodes the repeatedly received system information to thereby improving a decoding success rate.

DESCRIPTION OF EXEMPLARY EMBODIMENTS

Figure 1:
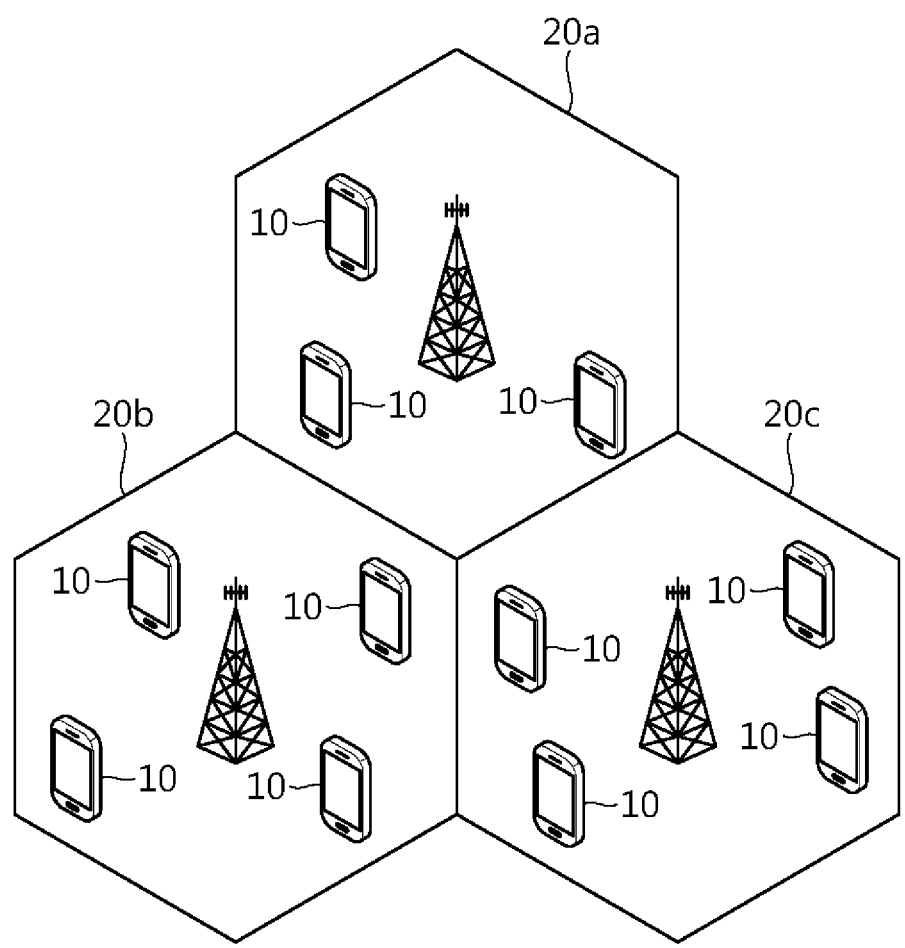
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
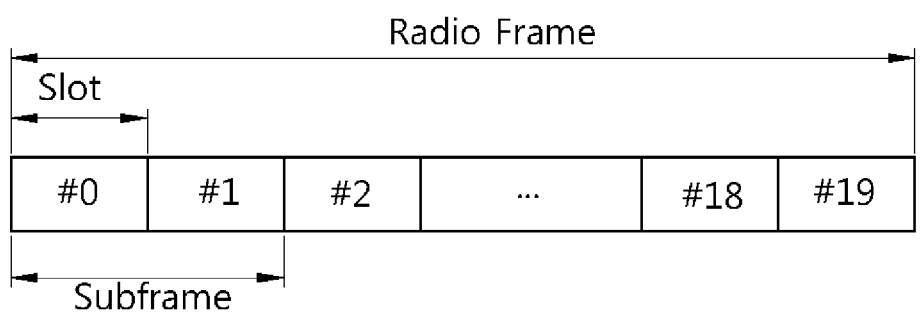
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
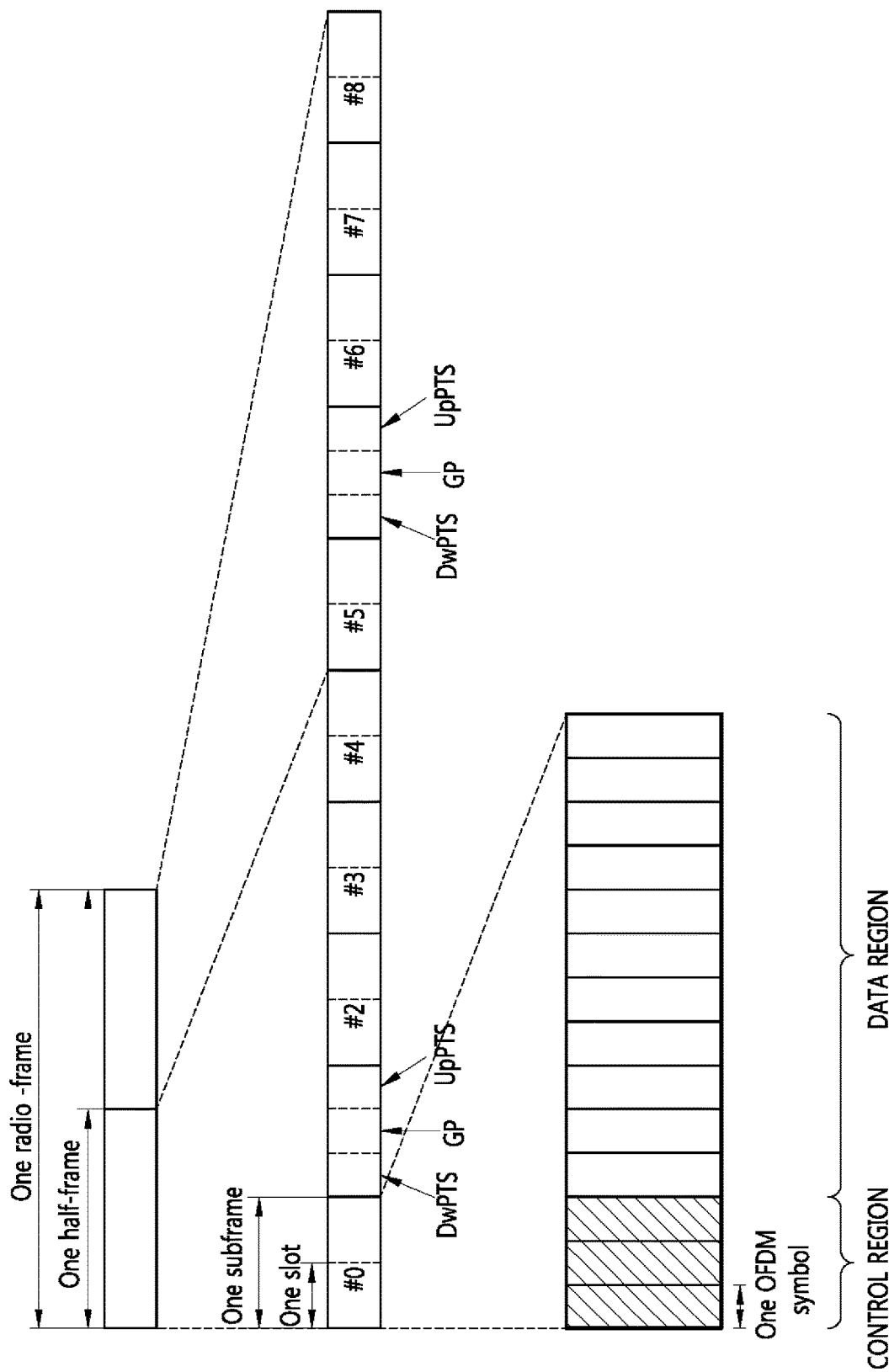
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
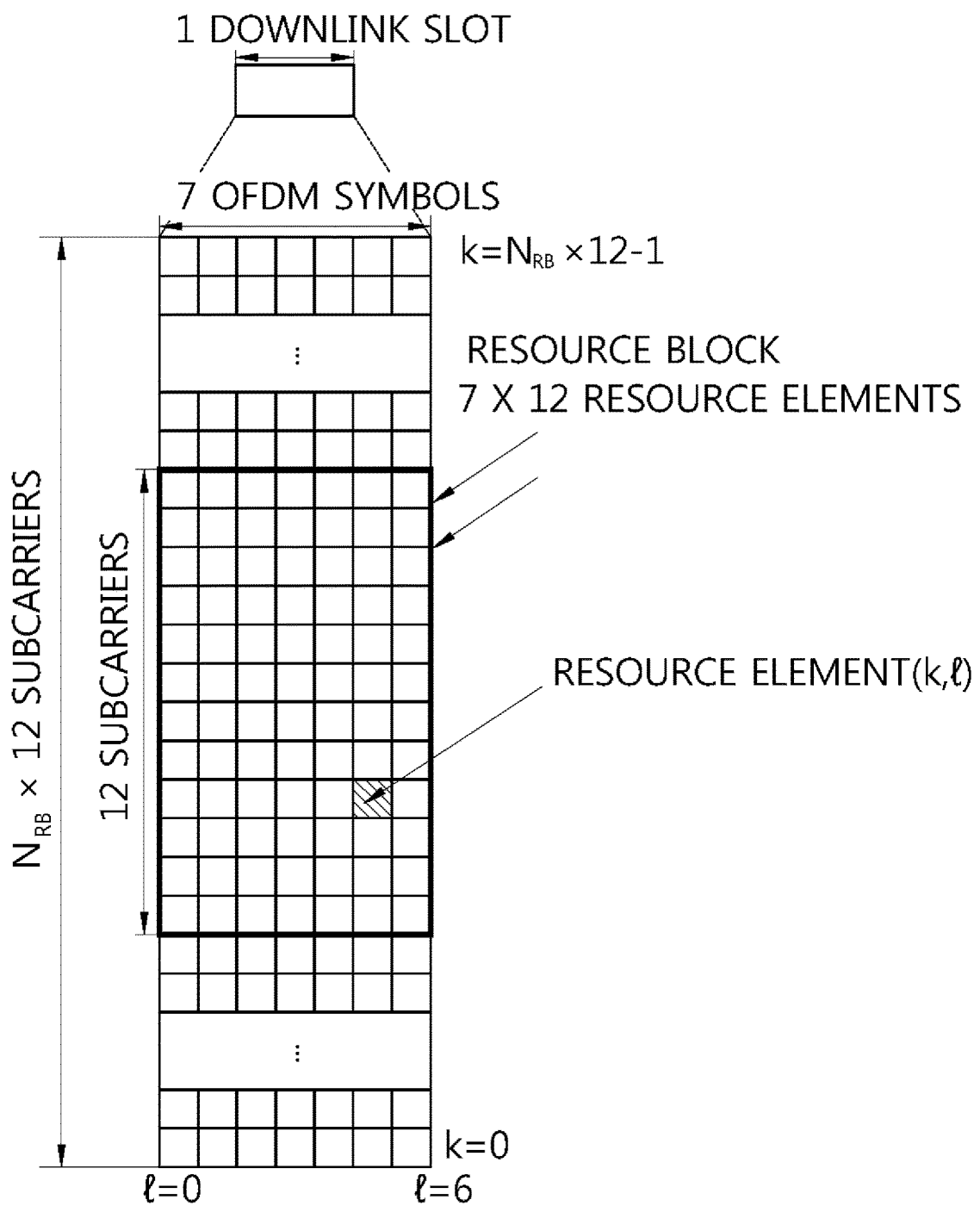
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
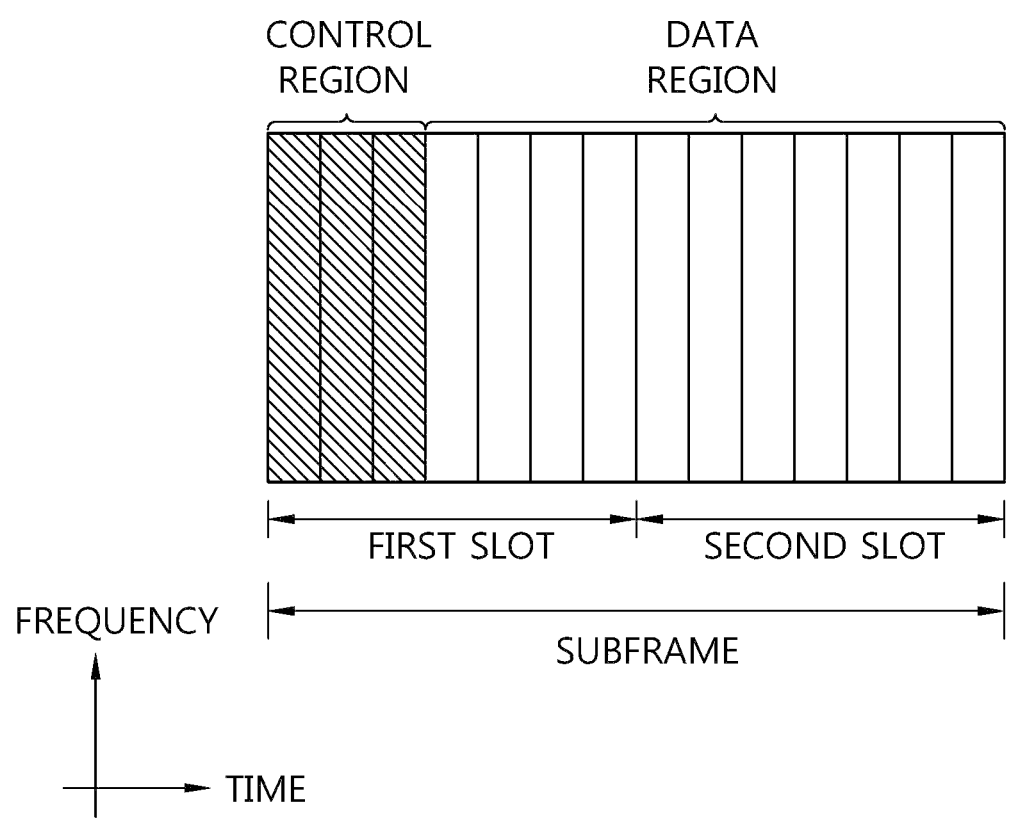
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
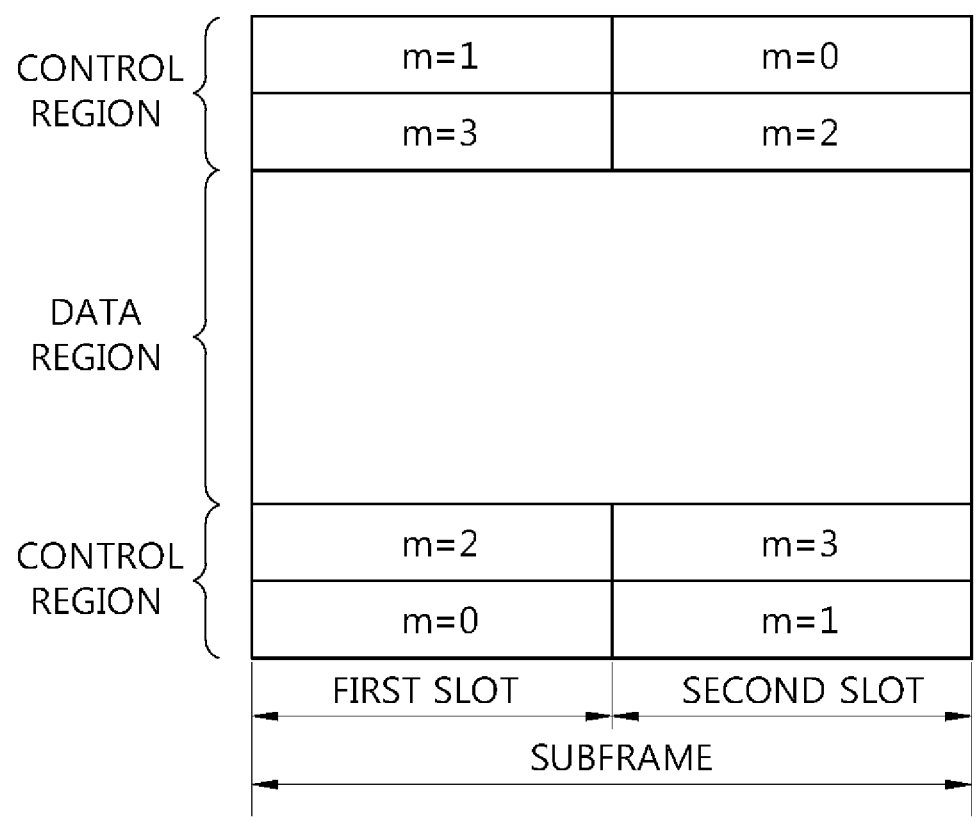
FIG. 6 illustrates the architecture of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
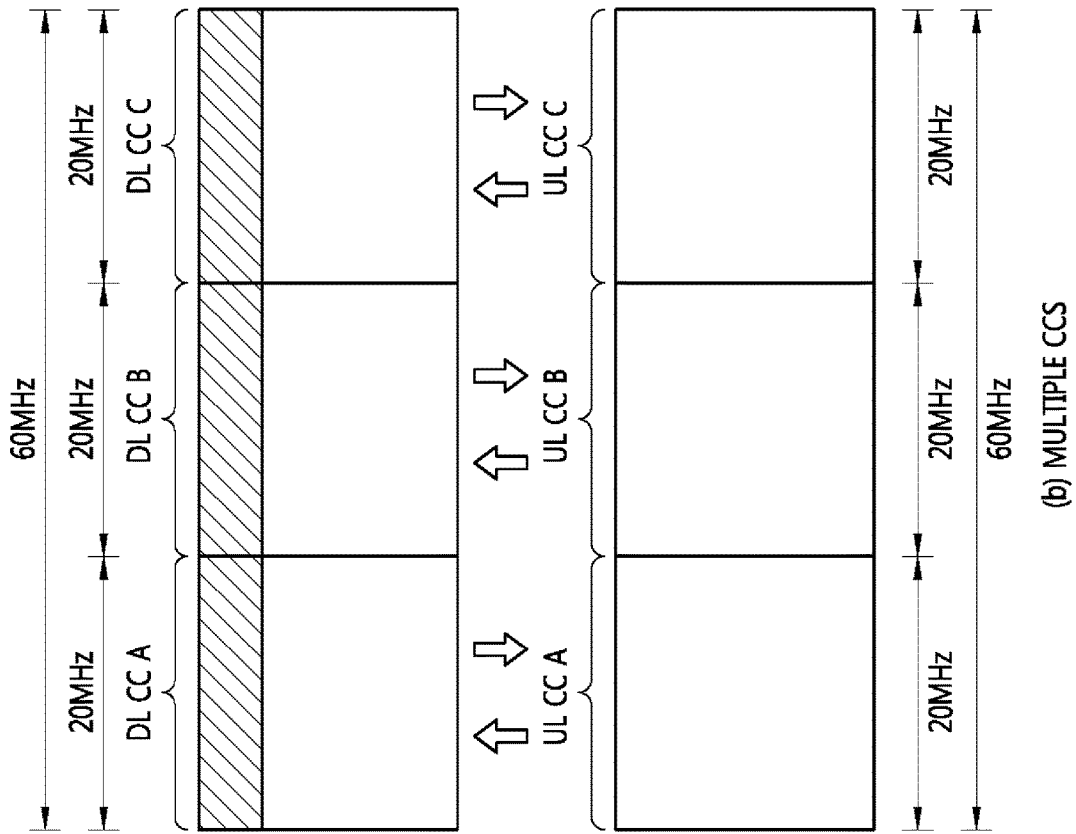
FIG. 7 illustrates an example of comparison between a single carrier system and a carrier aggregation system.
Figure 7:
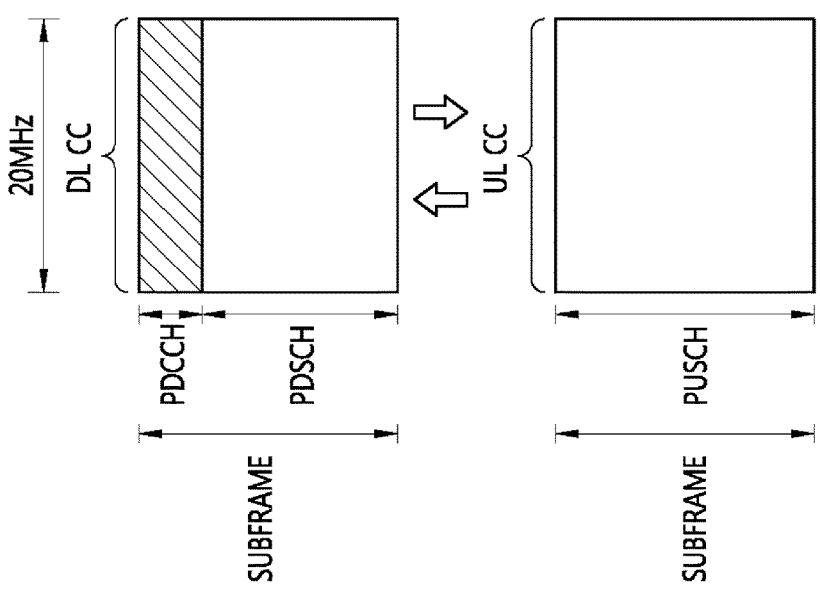

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
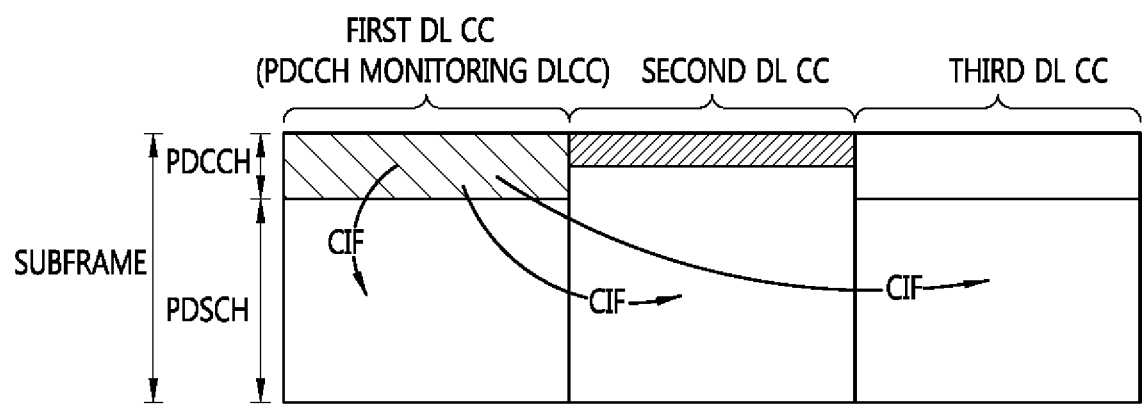
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9:
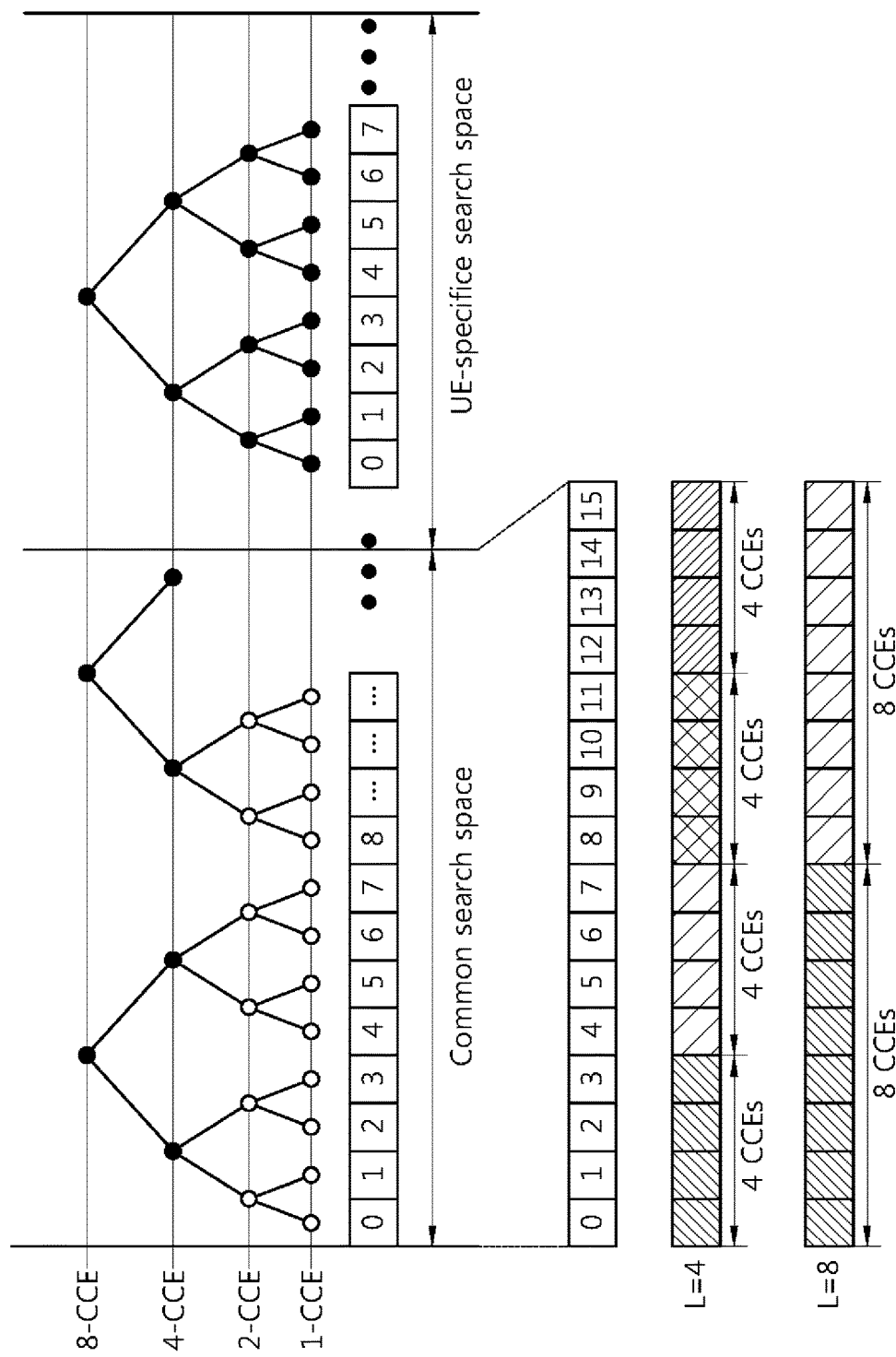
FIG. 9 illustrates an example of monitoring a PDCCH.

FIG. 9 illustrates an example of monitoring a PDCCH.

The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 10:
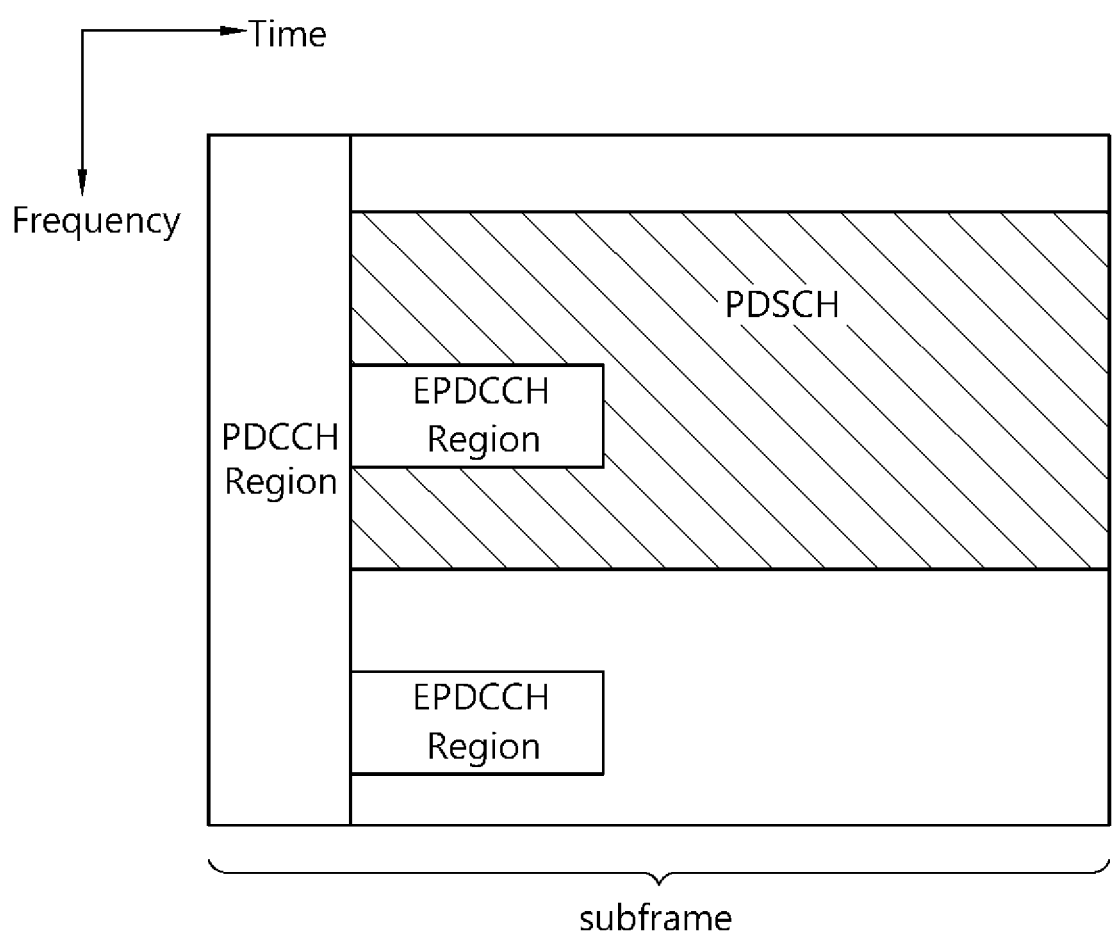
FIG. 10 illustrates a subframe having an EPDCCH.

FIG. 10 illustrates a subframe having an EPDCCH.

A subframe may include a zero or one PDCCH region or zero or more EPDCCH regions.

The EPDCCH regions are regions in which a wireless device monitors an EPDCCH. The PDCCH region is located in up to four front OFDM symbols of a subframe, while the EPDCCH regions may flexibly be scheduled in OFDM symbols after the PDCCH region.

One or more EPDCCH regions may be designated for the wireless device, and the wireless devices may monitor an EPDCCH in the designated EPDCCH regions.

The number/location/size of the EPDCCH regions and/or information on a subframe for monitoring an EPDCCH may be provided by a base station to a wireless device through an RRC message or the like.

In the PDCCH region, a PDCCH may be demodulated based on a CRS. In the EPDCCH regions, a demodulation (DM) RS may be defined, instead of a CRS, for demodulation of an EPDCCH. An associated DM RS may be transmitted in the corresponding EPDCCH regions.

The respective EPDCCH regions may be used for scheduling of different cells. For example, an EPDCCH in the EPDCCH region may carry scheduling information for a primary cell, and an EPDCCH in the EPDCCH region may carry scheduling information for a secondary cell.

When an EPDCCH is transmitted through multiple antennas in the EPDCCH regions, the same precoding as that for the EPDCCH may be applied to a DM RS in the EPDCCH regions.

A PDCCH uses a CCE as a transmission resource unit, and a transmission resource unit for an EPDCCH is referred to as an enhanced control channel element (ECCE). An aggregation level may be defined as a resource unit for monitoring an EPDCCH. For example, when 1 ECCE is a minimum resource for an EPDCCH, an aggregation level may be defined as L={1, 2, 4, 8, 16}.

Hereinafter, an EPDDCH search space may correspond to an EPDCCH region. In the EPDCCH search space, one or more EPDCCH candidates may be monitored by one or more aggregation levels.

Figure 11A:
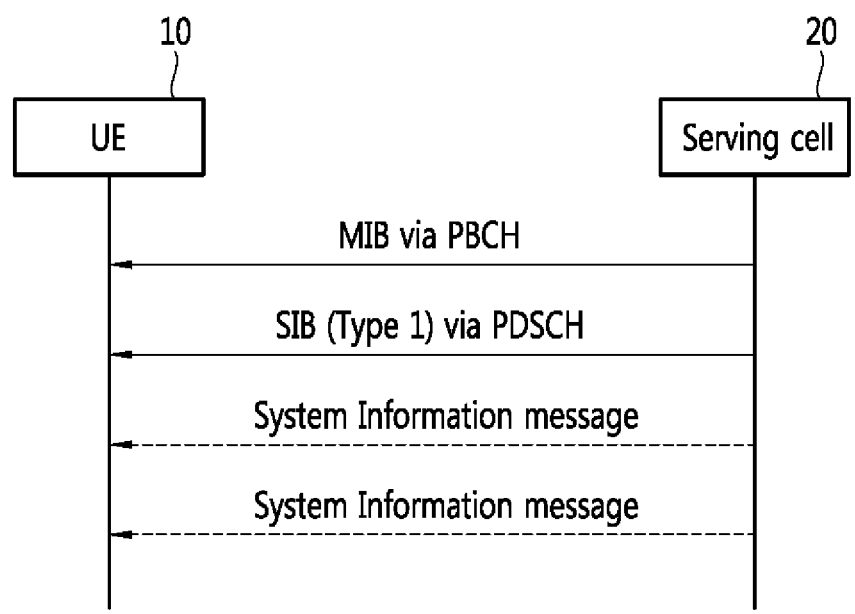
FIG. 11A illustrates one example of transmitting system information.

FIG. 11A illustrates one example of transmitting system information.

The system information is divided into a master information block (MIB) and multiple system information blocks (SIBs). The MIB includes most important physical layer information of a cell. Multiple types of SIBs are provided. A first type SIB includes information used to evaluate whether the UE is permitted to access the cell and moreover, includes scheduling information of other types of SIBs. A second type SIB (SIB type 2) includes common and sharing channel information. A third type SIB (SIB type 3) includes cell reselection information primarily associated with the serving cell. A fourth type SIB (SIB type 4) includes frequency information of the serving cell and intra frequency information of a neighboring cell associated with cell reselection. A fifth type SIB (SIB type 5) includes information on another E-UTRA frequency and inter frequency information of the neighboring cell associated with the cell reselection. A sixth type SIB (SIB type 6) includes information on a UTRA frequency and information on a UTRA neighboring cell associated with the cell reselection. A seventh type SIB (SIB type 7) includes information on a GERAN frequency associated with the cell reselection.

As known with reference to FIG. 11A, the MIB is transferred to the UE 10 on the PBCH. Moreover, the first type SIB (SIB type 1) is mapped to a DL-SCH to be transferred to the UE 10 on the PDSCH. Other types of SIBs are transferred to the UE on the PDSCH through a system information message.

Figure 11B:
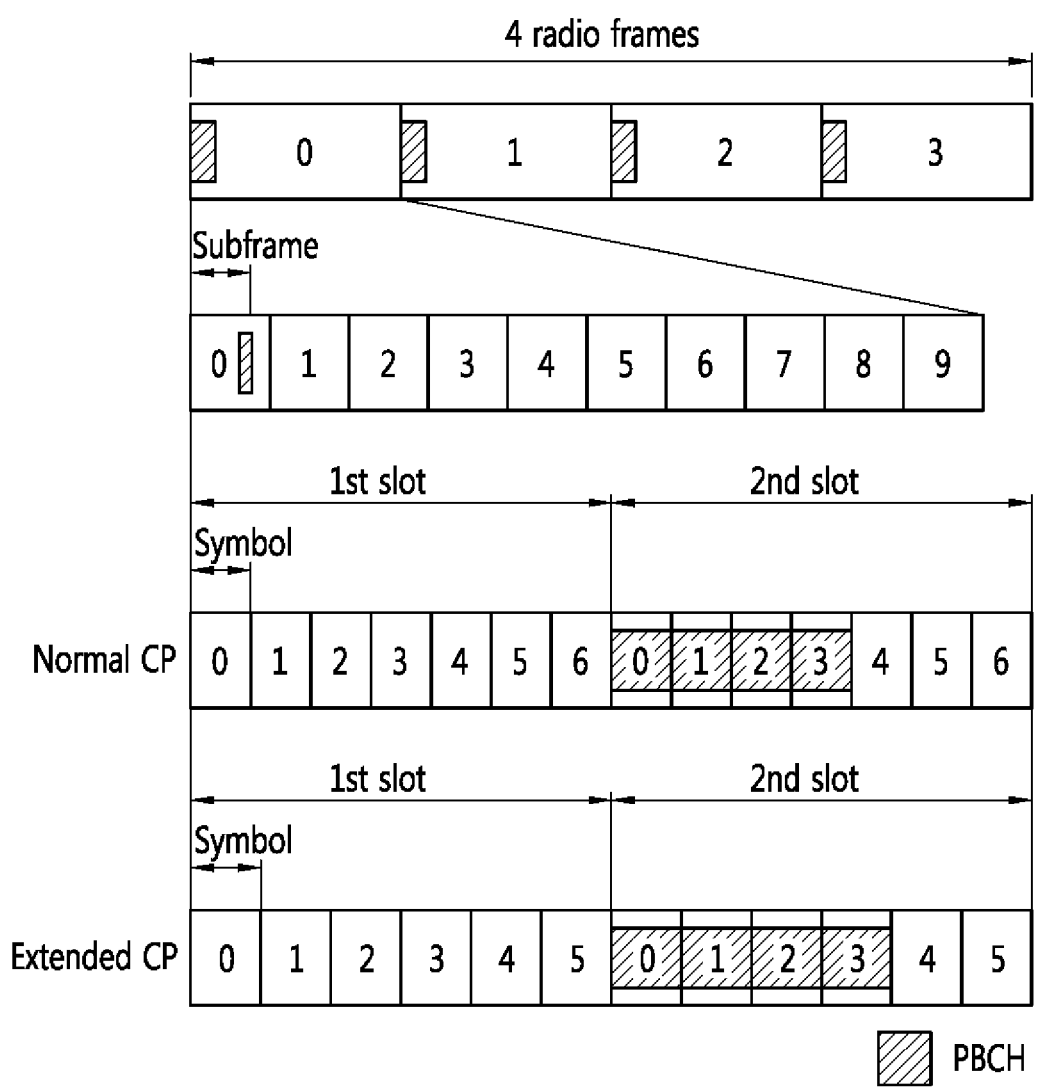
FIG. 11B illustrates a frame structure for a physical broadcast channel (PBCH) in which an MIB is transmitted.

FIG. 11B illustrates a frame structure for a physical broadcast channel (PBCH) in which an MIB is transmitted.

As illustrated in FIG. 11B, the radio frame, the subframe, and the symbol number start from 0. The PBCH is transmitted every radio frame, that is, 10 ms.

As illustrated in FIG. 11B, the PBCH is transmitted on subframe #0 of each radio frame. In more detail, the PBCH is transmitted on symbols #0, 1, 2, and 3 of a second slot.

The PBCH is used for each base station to transmit the most important MIB for operating the system and the MIB information is retransmitted four times per 10 ms at a very low coding rate so that all UEs accessing the corresponding cell receive the MIB information with reliability, thereby enabling receiving the MIB information even under a considerable poor channel environment.

On the other hand, MIB information of a total of 24 bits is defined as follows in TS36.331 of the current LTE standard.

TABLE 2

```
-- ASN1START
MasterInformationBlock ::=    SEQUENCE {
    dl-Bandwidth       ENUMERATED {
        n6, n15, n25, n50, n75, n100},
    phich-Config       PHICH-Config,
    systemFrameNumber       BIT STRING (SIZE (8)),
    spare        BIT STRING (SIZE (10))
}
-- ASN1STOP
```

The MIB information is generally transmitted as the predetermined same data every corresponding cell except for a systemFrameNumber field in each transmission and when changing the SIB including the MIB is required due to other reasons, the MIB information is notified to all UEs in the cell through separate paging RRC signaling.

Figure 11C:
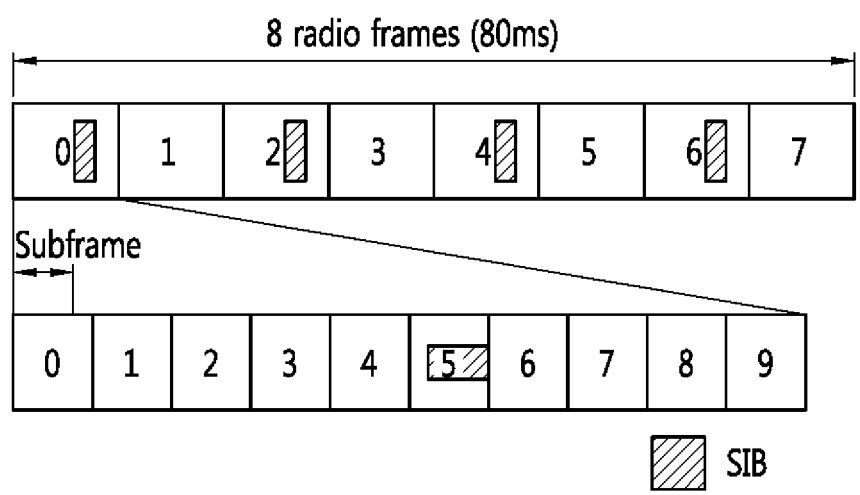
FIG. 11C illustrates a transmission example of a first type system information block on a radio frame.

FIG. 11C illustrates a transmission example of a first type system information block on a radio frame.

As known with reference to FIG. 11C, the first type SIB (SIB type 1) is transmitted at a cycle of 8 radio frames (that is, 80 ms cycle) and repeatedly retransmitted on subframe #5 of the radio frame, which satisfies system frame number (SFN) mod 2 in the cycle of 8 radio frames (80 ms).

On the other hand, the first type SIB (SIB type 1) is defined as follows in TS36.331 of the current LTE standard.

TABLE 3

```
-- ASN1START
SystemInformationBlockType1 ::=   SEQUENCE {
    cellAccessRelatedInfo      SEQUENCE {
        plmn-IdentityList       PLMN-IdentityList,
        trackingAreaCode        TrackingAreaCode,
        cellIdentity            CellIdentity,
        cellBarred              ENUMERATED {barred, notBarred},
        intraFreqReselection    ENUMERATED {allowed, notAllowed},
        csg-Indication          BOOLEAN,
        csg-Identity            CSG-Identity
    },
    cellSelectionInfo        SEQUENCE {
        q-RxLevMin              Q-RxLevMin,
        q-RxLevMinOffset        INTEGER (1..8)
    },
    p-Max                    P-Max
    freqBandIndicator        FreqBandIndicator,
    schedulingInfoList       SchedulingInfoList,
    tdd-Config               TDD-Config
    si-WindowLength          ENUMERATED {ms1, ms2, ms5, ms10, ms15, ms20, ms40},
    systemInfoValueTag       INTEGER (0..31),
    nonCriticalExtension     SystemInformationBlockType1-v890-IEs
}
```

Meanwhile, hereinafter, the MTC will be described.

Figure 12A:
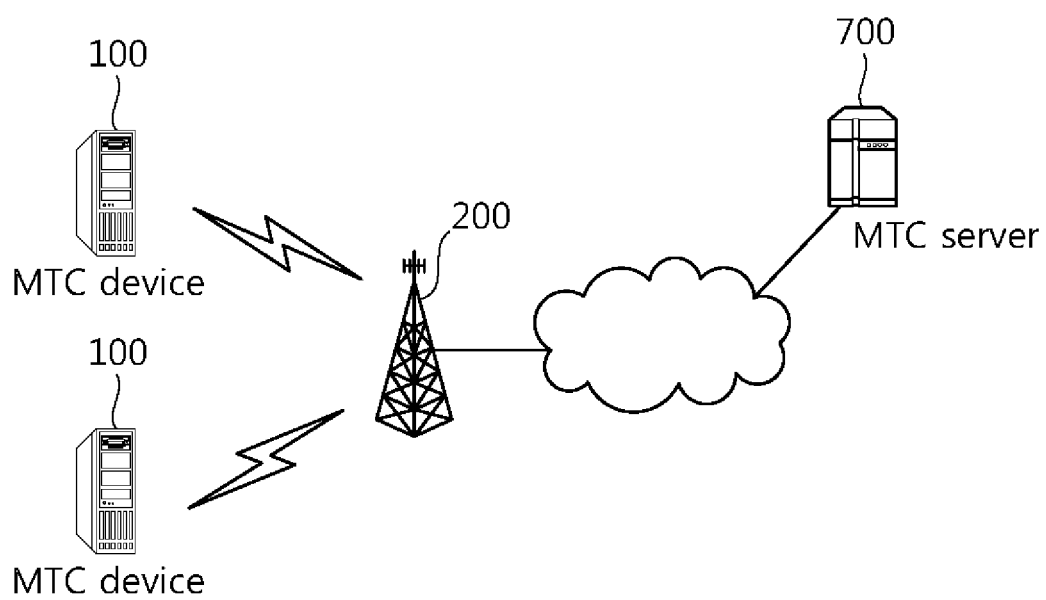
FIG. 12A illustrates one example of machine type communication (MTC).

FIG. 12A illustrates one example of machine type communication (MTC).

The machine type communication (MTC) represents an information exchange through a base station 200 among MTC devices, which does not accompany human interaction or an information exchange between the MTC device 100 and an MTC server 700 through the base station.

The MTC server 700 is an entity which communicates with the MTC device 100. The MTC server 700 executes an MTC application and provides an MTC specific service tot eh MTC device.

The MTC device 100 as a wireless device providing MTC may be fixed or movable.

A service provided through the MTC has discrimination from a service in communication in which humans intervene in the related art and various categories of services including tracking, metering, payment, a medical field service, remote control, and the like are provided. In more detail, the service provided through the MTC may include reading of a meter, measurement of a water level, utilization of a monitoring camera, stock management of a vending machine, and the like.

In the case of peculiarities of the MTC device, since a transmission data amount is small and uplink/downlink transmission/reception is often performed, it is efficient to lower a price of the MTC device and reduce battery consumption according to the low data transmission rate. The MTC device has a characteristic in that mobility is low, and as a result, the MTC device has a characteristic in which a channel environment is not almost changed.

Figure 12B:
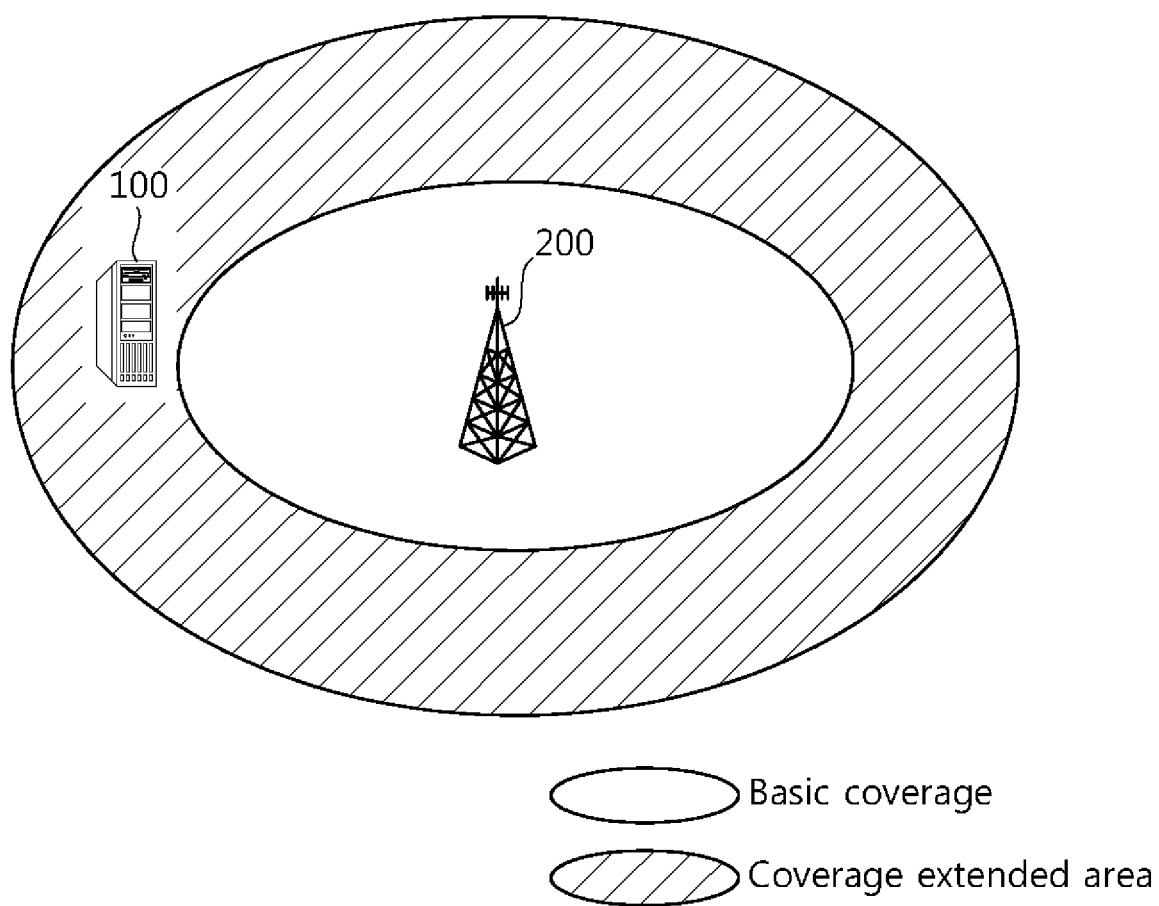
FIG. 12B is an example of cell coverage expansion for an MTC device.

FIG. 12B is an example of cell coverage expansion for an MTC device.

In recent years, expanding cell coverage has been considered for the MTC device and various techniques for expanding the cell coverage has been discussed.

However, in the case where the coverage of the cell is expanded, when the base station transmits the MIB, the SIB, and the like as transmitting the system information to general UE, the MTC device located in a cell coverage expanded area has a difficulty in receiving the MIB, the SIB, and the like. In particular, the first type SIB (that is, SIB type 1) may be changed after an update window having a length of 80 ms and the MTC device located in the cell coverage expanded area may not correctly decode the first type SIB (that is, SIB type 1) until the update window ends.

<Disclosures of Present Specification>

Accordingly, the disclosures of the specification have been made in an effort to provide a scheme that solves the problem. In particular, hereinafter, the disclosures of the specification will be described based on the SIB. Further, for easy description, in the specification, the first type SIB (that is, SIB type 1) is primarily described, but is not limited thereto and a core of the specification may be applied even to other types of SIBs.

Figure 13A:
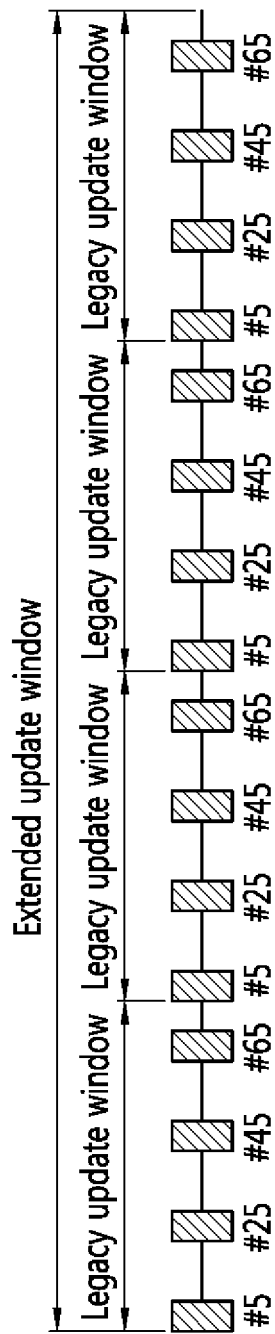
FIG. 13A illustrates one scheme for allowing the MTC device located in a cell coverage expanded area to receive the first type system information block.

FIG. 13A illustrates one scheme for allowing the MTC device located in a cell coverage expanded area to receive the first type system information block (SIB).

In order to solve the problem, instead of the existing update window, that is, 80 ms (8 radio frames) for the first type SIB (that is, SIB type 1) in the related art, the base station uses the expanded update window and may not update information on the first type SIB (that is, SIB type 1) during the expanded update window interval.

When an update window capable of receiving 4 first type SIBs (that is, SIB type 1) in related art is expanded, the MTC device receives first type SIBs (that is, SIB type 1) receives much more first type SIBs (that is, SIB type 1) than 4 first type SIBs and thereafter, combines and decodes the first type SIBs to increase a success probability of decoding. However, when the length of the update window is too large, overhead increases contrary to this, and as a result, it should be careful. For example, when the expanded update window is 25 times longer than the update window in the related art, the MTC device may decode the SIBs at last after receiving the SIBs through approximately 100 subframes, and as a result, the overhead increases. Since SIB type 1 is received four times during 80 ms (that is, 8 radio frames), when after all of first type SIBs (that is, SIB type 1) are received on 100 subframes, the SIBs may be decoded at last, a total of 2000 ms (that is, a total of 200 radio frames) are required. This may be very large overhead in terms of the MTC device. Similarly, it is advantageous in that it takes too much time even for the base station to update the information on the first type SIB (that is, SIB type 1). In order to solve the disadvantage, the expanded SIB update window may be varied by the base station and even before the expanded SIB update window ends, the MTC device may attempt combining and decoding first type SIBs (that is, SIB type 1) received until then.

Figure 13B:
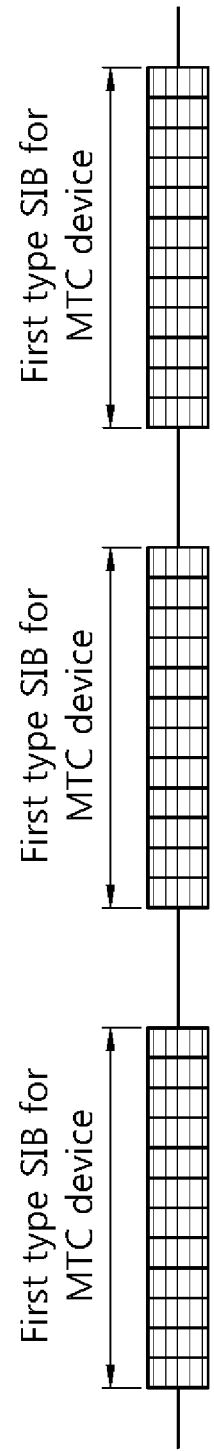
FIG. 13B illustrates another scheme for allowing the MTC device located in the cell coverage expanded area to receive the first type system information block.

FIG. 13B illustrates another scheme for allowing the MTC device located in the cell coverage expanded area to receive the first type system information block (SIB).

As known with reference to FIG. 13B, the base station (eNodeB) 200 may not transmit the first type SIB (that is, SIB type 1) for the MTC device 100 on subframes #5, 25, 45, and 65 in the update window having the length of 80 ms but repeatedly transmits the first type SIB (that is, SIB type 1) on multiple consecutive subframes (that is, bundling subframe).

As such, when a transmission scheme of the first type SIB (that is, SIB type 1) for the MTC device 100 is different from a transmission scheme for the UE in the related art, a location of a transmission start subframe of the first type SIB (that is, SIB type 1), information on a period of the transmission subframe, and/or information on a transmission RB area of the first type SIB (that is, SIB type 1) may be designated in advance or transferred to the MTC device 100 through the MIB or the RRC signaling. In detail, information on a location of a system frame number (SFN) in which the MTC device 100 may receive the first type SIB (that is, SIB type 1) needs to be notified to the MTC device 100 so as for the MTC device 100 to receive the first type SIB (that is, SIB type 1) with low complexity. The location information of the SFN may be designated in advance or transferred to the MTC device through the MIB or RRC signaling. In this case, when the information is designated in advance, the transmission of the information may be omitted. Alternatively, the information may be expressed through bits which are not currently used but reserved.

Meanwhile, when the first type SIB (that is, SIB type 1) for the MTC device is transmitted on multiple consecutive subframes (that is, bundling subframe), a location of a subframe in which the transmission of the first type SIB (that is, SIB type 1) starts may be determined according to a location where the PBCH is transmitted. In this case, the PBCH may be a PBCH which the general UE may also receive, but may be a dedicated PBCH for the MTC device 100 requiring the cell coverage extension (CE). The dedicated PBCH may be called a CE PBCH. In the case where the dedicated PBCH (alternatively, CE PBCH) is received from the base station on multiple consecutive subframes (that is, bundling subframe), a last subframe among the multiple consecutive subframes is referred to as 'subframe n', the location of a subframe where reception of the first type SIB (that is, SIB type 1) for the MTC device 100 starts may be determined as 'subframe n+k' after the subframe where the dedicated PBCH (alternatively, CE PBCH) is received by k subframes. In this case, a value of the k may be a predetermined value. The value of the k may be, for example, 0. Alternatively, the value of the k may be notified to the MTC device through the MIB.

On the other hand, when the first type SIB (additional first type SIB or new first type SIB) for the MTC device is transmitted through the consecutive subframes, the first type SIB for the MTC device is configured to be transmitted on the same subframe and the same RB area as another channel in the related art, and as a result, a conflict may occur.

Hereinafter, it will be described which channel may conflict with the first type SIB (that is, SIB type 1) for the MTC device and each solving scheme will be described. Alternatively, an MTC device which will have low performance may be limited in terms of a PDSCH receiving PRB size in order to increase a distribution rate with low cost and the MTC device may not receive both a cell common PDSCH and a general PDSCH or both the EPDCCH and the PDSCH. However, when the base station transmits both the cell common PDSCH and the general PDSCH or both the EPDCCH and the PDSCH, a solving scheme to be described below may be adopted.

Figure 14A:
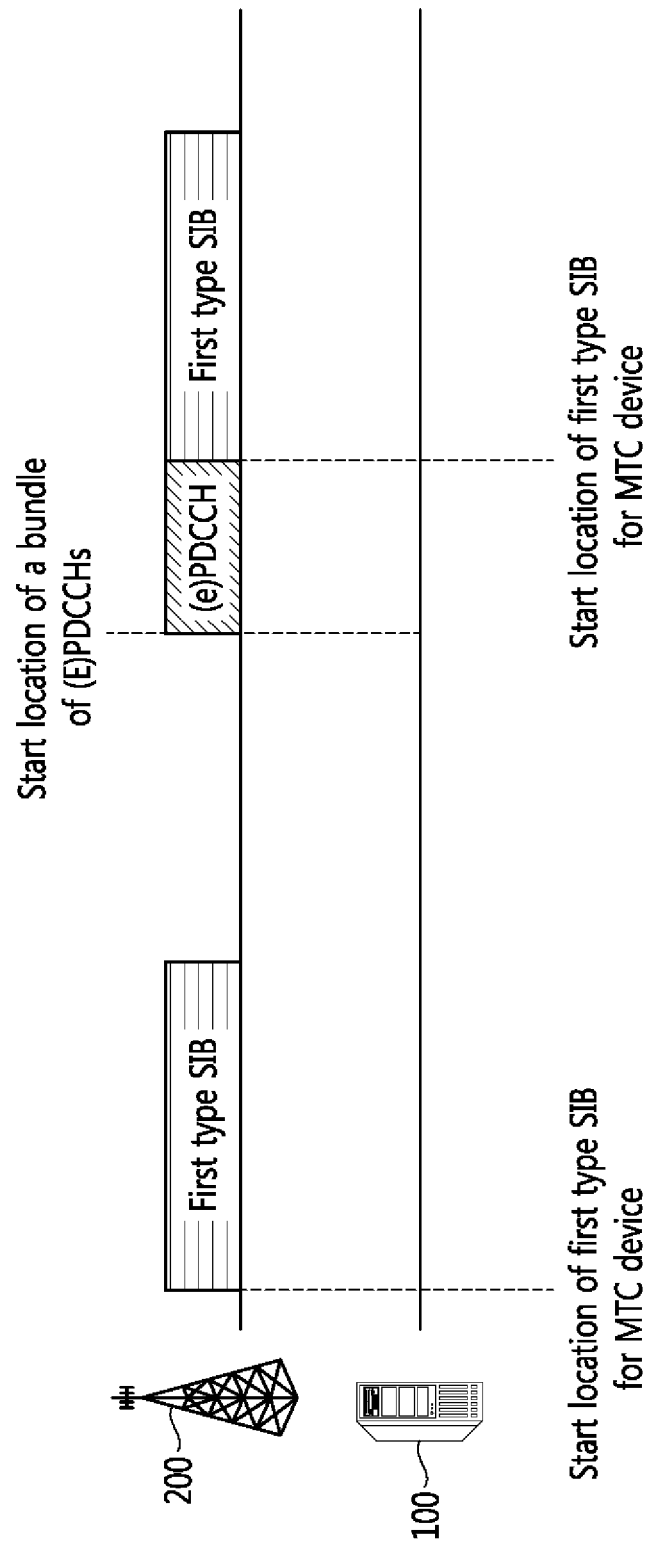
FIGS. 14A to 14C illustrate an example in which the first type system information block for the MTC device and the PDCCH/ePDCCH conflict with each other.
Figure 14B:
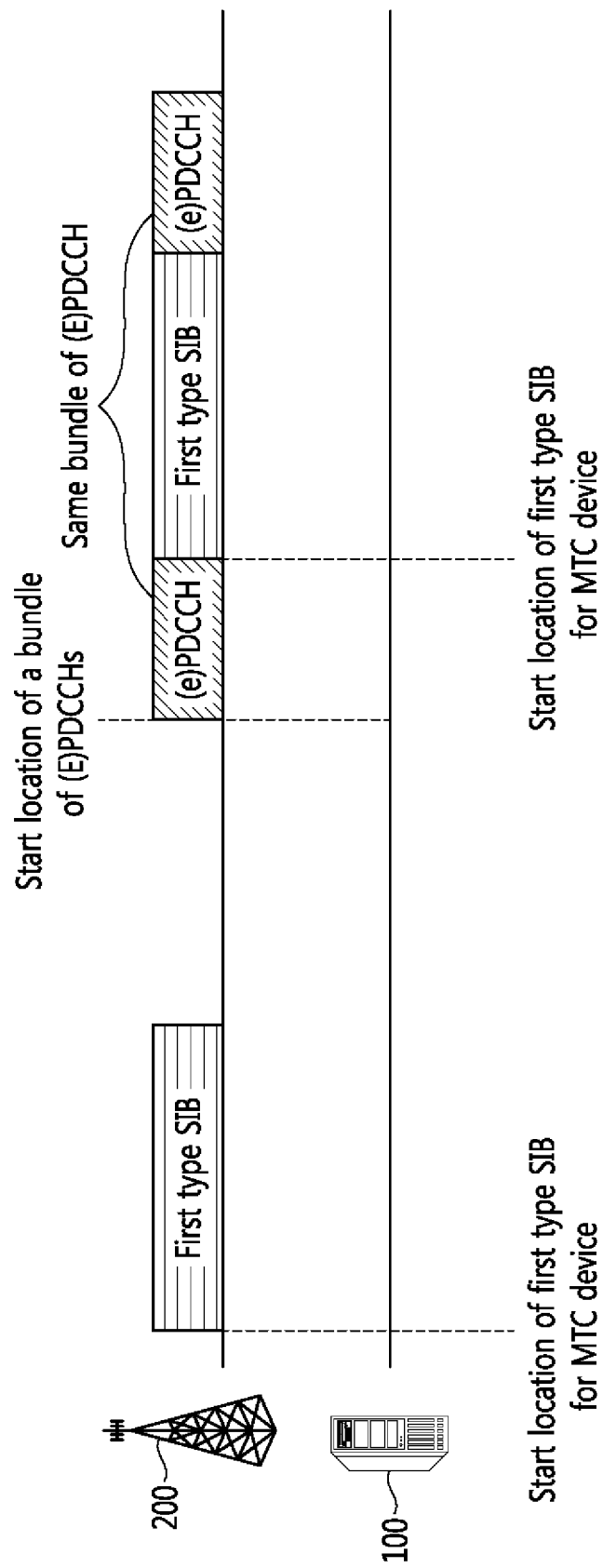
Figure 14C:
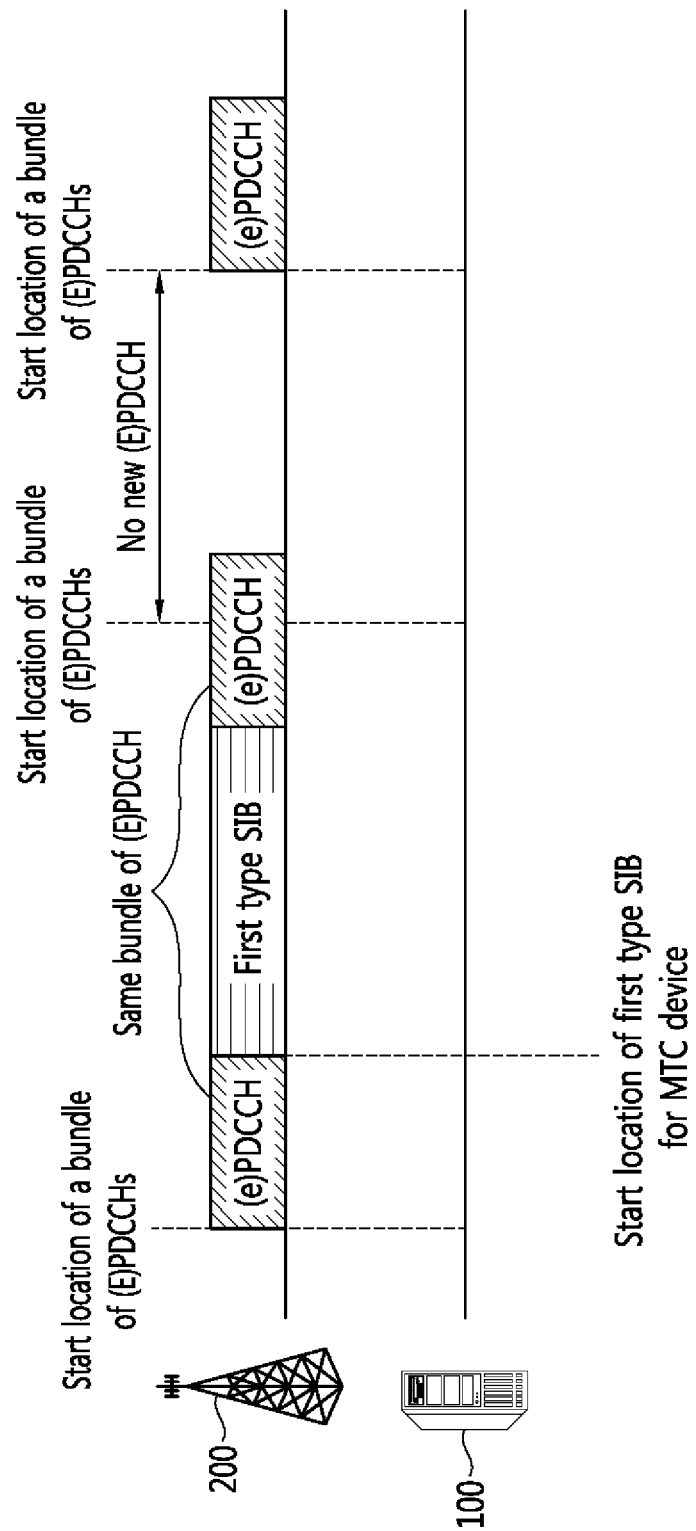

FIGS. 14A to 14C illustrate an example in which the first type system information block (SIB) for the MTC device and the PDCCH/ePDCCH conflict with each other on the same subframe or a PRB area.

First, FIGS. 14A to 14C illustrate a situation in which the first type SIB (that is, SIB type 1) for the MTC device and the PDCCH/ePDCCH conflict with each other, but FIGS. 14A to 14C may be applied even to a case in which a cell specific PDSCH and another channel conflict with each other. Further, contents to be described below with reference to FIGS. 14A to 14C may be applied even to the transmission of the first type SIB (that is, SIB type 1) or the cell specific PDSCH in the related art.

In order for the illustrated base station 200 to transmit the first type SIB (that is, SIB type 1) for the MTC device requiring the coverage extension (CE), first, the base station needs to transfer the PDCCH including the scheduling information to the MTC device. In this case, the PDCCH/ePDCCH containing the scheduling information for the PDSCH including the first type SIB (that is, SIB type 1) for the MTC device may be repeatedly transmitted on N subframes (that is, bundling subframe).

In this case, a difference between a location of a subframe where bundling transmission of the PDCCH/ePDCCH starts and a location of a subframe where bundling transmission of the first type SIB (that is, SIB type 1) for the MTC device is expected to start may have a smaller value than N subframes which are a bundling size of the PDCCH/ePDCCH. Accordingly, the bundle of the PDCCH/ePDCCH and the bundle of the first type SIB (that is, SIB type 1) for the MTC device may conflict with each other and an operation of the MTC device in such a case needs to be defined.

First, as illustrated in FIG. 14A, when the transmission of the bundle of the SIB type for the MTC device starts while the MTC device 100 receives the bundle of the PDCCH/ePDCCH, the MTC device 100 may abandon receiving the PDCCH/ePDCCH and attempt to receive the bundle of the first type SIB (that is, SIB type 1) for the MTC device. Alternatively, the MTC device 100 may assume that the PDCCH/ePDCCH is not transmitted at the location of the subframe where the transmission of the bundle of the PDCCH/ePDCCH starts when the difference between the location of the subframe where the transmission of the bundle of the PDCCH/ePDCCH starts and a location of a subframe where transmission of the bundle of the SIB type is expected to start is smaller than N subframes which is the size of the bundle of the PDCCH/ePDCCH.

Second, as illustrated in FIG. 14B, when the transmission of the bundle of the SIB type for the MTC device starts while the MTC device 100 receives the bundle of the PDCCH/ePDCCH, the MTC device 100 may stop receiving the PDCCH/ePDCCH and attempt to receive the bundle of the residual PDCCH/ePDCCH after a transmission period of the bundle of the SIB type ends.

Alternatively, as illustrated in FIG. 14C, the MTC device 100 may assume that the PDCCH/ePDCCH is not transmitted at the location of the subframe where the transmission of the bundle of the corresponding PDCCH/ePDCCH starts when a difference between a location of a subframe where transmission of a bundle of a first PDCCH/ePDCCH starts and a location of a subframe where transmission of a bundle of a subsequent second PDCCH/ePDCCH is smaller than N subframes which is the size of the bundle of the PDCCH/ePDCCH.

Figure 15A:
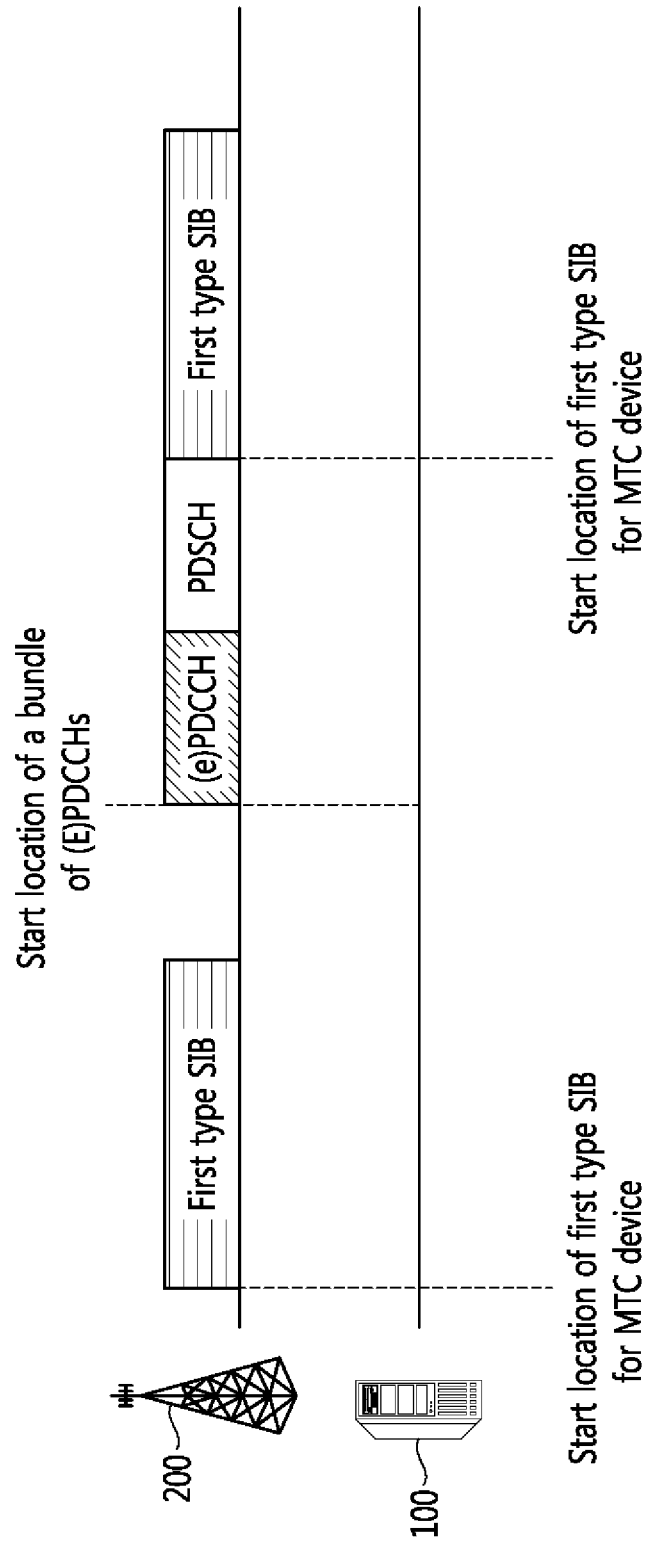
FIGS. 15A and 15B illustrate an example in which the first type system information block for the MTC device and a PDSCH conflict with each other.
Figure 15B:
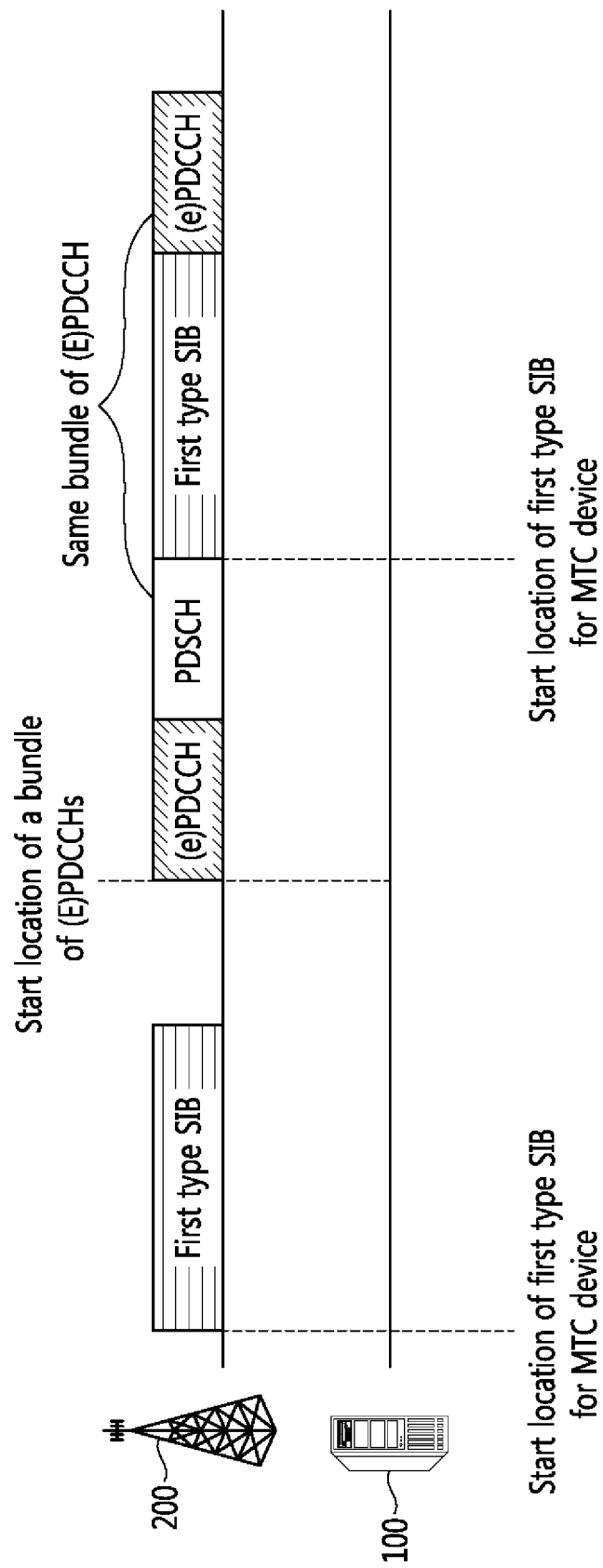

FIGS. 15A and 15B illustrate an example in which the first type system information block for the MTC device and a PDSCH conflict with each other on the same subframe or the PRB area.

The illustrated base station 200 may repeatedly transmit the PDSCH on D subframes (that is, bundling subframe) for the MTC device requiring the coverage extension (CE). However, the difference between the location of the subframe where the transmission of the transmission of the PDCCH/ePDCCH starts and the location of the subframe where the transmission of the bundle of the SIB type is expected to start may have a smaller value than D subframes which are the size of the bundle of the PDSCH. Accordingly, the bundle of the PDSCH and the bundle of the first type SIB (that is, SIB type 1) for the MTC device may conflict with each other and an operation of the MTC device in such a case needs to be defined.

First, as illustrated in FIG. 15A, when the transmission of the bundle of the SIB type starts while the MTC device 100 receives the bundle of the PDSCH, the MTC device 100 may stop receiving the PDSCH and attempt to receive the bundle of the SIB type. Alternatively, the MTC may assume that the PDSCH not transmitted when the difference between the location of the subframe where the transmission of the bundle of the PDSCH starts and the location of the subframe where the transmission of the bundle of the SIB type is expected to start is smaller than D subframes which is the size of the bundle of the PDSCH.

Second, as illustrated in FIG. 15B, when the transmission of the bundle of the SIB type starts while the MTC device 100 receives the bundle of the PDSCH, the MTC device 100 may stop receiving the PDSCH and attempt to receive the bundle of the residual PDSCHs after the transmission period of the bundle of the SIB type ends.

Alternatively, the MTC device 100 may assume that the bundle of the SIB type is not transmitted at the location of the subframe where the transmission of the bundle of the SIB type starts when the difference between the location of the subframe where the transmission of the bundle of the PDSCH starts and the location of the subframe where the transmission of the bundle of the SIB type starts is smaller than D subframes which is the size of the bundle of the PDSCH.

Figure 16:
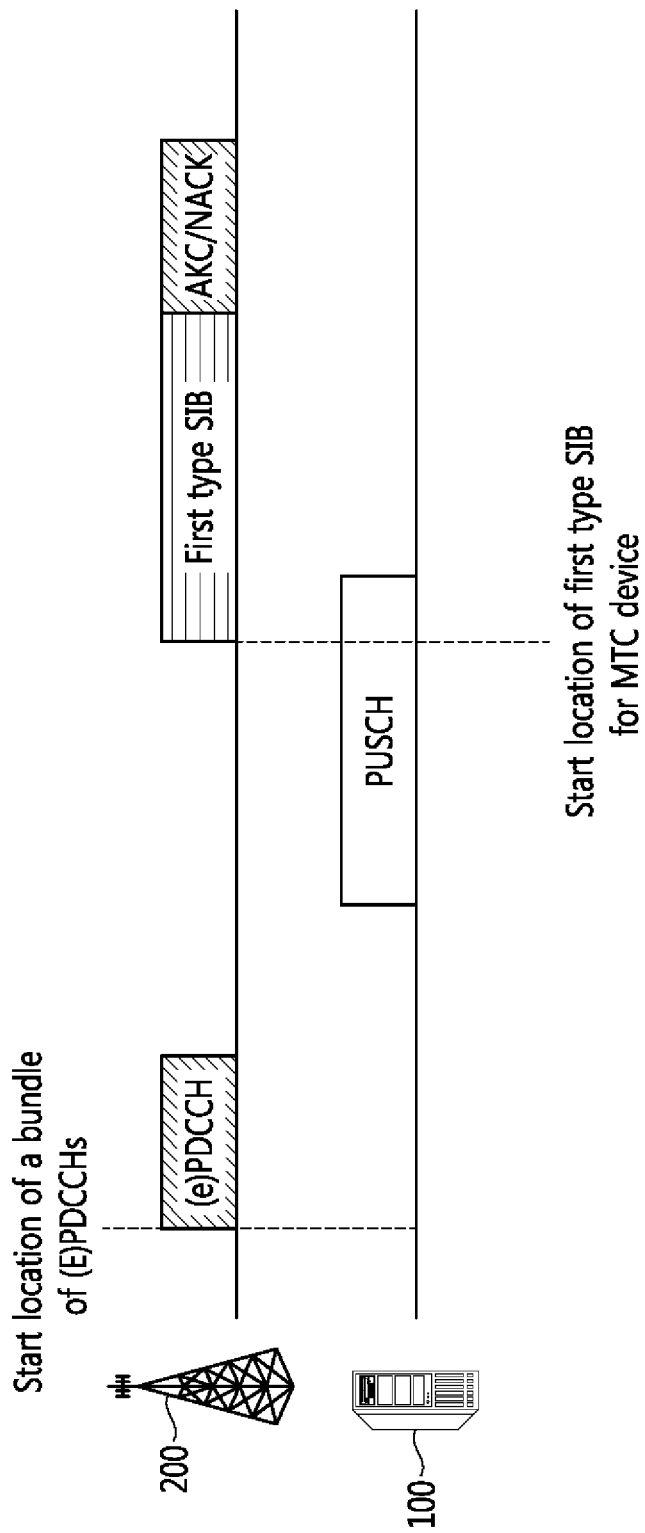
FIG. 16 illustrates an example in which the first type system information block for the MTC device and an ACK/NACK conflict with each other.

FIG. 16 illustrates an example in which the first type system information block for the MTC device and an ACK/NACK conflict with each other on the same subframe or the PRB area.

First, the MTC device 100 located in a coverage extension (CE) area of the base station 200 may repeatedly transmit the PUSCH on multiple subframes (that is, bundling subframe). Moreover, the base station 200 may repeatedly transmit the ACK/NACK for the PUSCH to the MTC device 100 on multiple subframes (that is, bundling subframe). However, a subframe where the ACK/NACK for the PUSCH is expected to be received may conflict with the subframe where the bundle of the SIB type is received.

In order to solve the conflict, the base station 200 may transmit the ACK/NACK for the PUSCH from the subframe after the transmission of the bundle of the SIB type ends.

However, when the transmission of the ACK/NACK for the PUSCH transmitted by the MTC device as described above is delayed, a transmission timing of the ACK/NACK transmitted by the MTC device and a transmission timing of an ACK/NACK transmission timing with another UE may overlap with each other. In order to solve the overlapping, the base station 200 may not transmit the ACK/NACK when a subframe that will transmit the ACK/NACK to the MTC device overlaps with the subframe where the bundle of the SIB type. In this case, although the MTC device may not receive the ACK/NACK, the MTC device may assume that the PUSCH transmitted by the MTC device is successfully transmitted to the base station.

Figure 17:
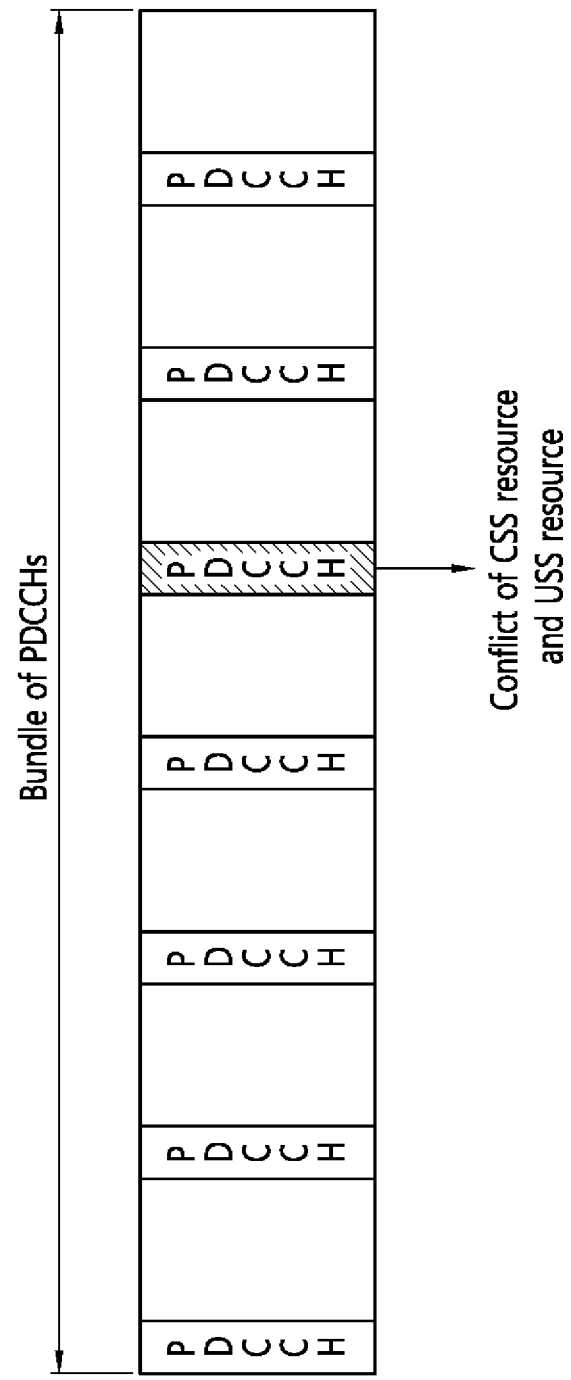
FIG. 17 illustrates an example in which a USS and CSS of the PDCCH overlap with each other.

FIG. 17 illustrates an example in which a USS and a CSS of the PDCCH overlap with each other.

As described above in brief, the PDSCH is masked with a radio network temporary identifier (RNTI) by a cyclic redundancy check (CRC). Various types of the RNTI, which include a C-RNTI, an RA-RNTI, a P-RNTI, an SI-RNTI, and the like are present according to a purpose of the RNTI. When the PDCCH is for specific UE, the PDCCH may be masked with the C-RNTI of the UE. Alternatively, when the PDCCH is for a paging message, the PDCCH may be masked with the P-RNTI. Alternatively, when the PDCCH is for the system information, that is, the SIB, the PDCCH may be masked with the SI-RNTI. In this case, a PDCCH masked with an MTC device specific RNTI (e.g., C-RNTI) will be hereinafter referred to as an MTC device specific (alternatively, UE-specific) PDCCH and a PDCCH masked with a cell unique RNTI (e.g., SI-RNTI, P-RNTI, and RA-RNTI) will be hereinafter referred to as a cell specific PDCCH or a cell common PDCCH.

The MTC device 100 located in the coverage extension (CE) area may attempt to receive the PDCCH through a common search space (CSS) area and a UE specific search space (USS) area. In this case, the MTC device 100 that attempts to receive the PDCCH through a plurality of subframes attempts to blind-decode the PDCCH through two search spaces in one subframe may increase complexity. Further, when the MTC device 100 attempts to receive the same PDCCH through the plurality of subframes, if a search space area where the corresponding PDCCH is transmitted varies for each subframe, the complexity depending on the blinding decoding may significantly increase in order for the MTC device 100 to successfully receive one PDCCH from the plurality of subframes. Moreover, when the MTC device 100 attempts to receive the PDCCH through the multiple subframes, if a resource of the CSS area and a resource of the USS are overlap with each other in a specific subframe, a situation may occur, in which the MTC device 100 is difficult to determine through which CSS area the PDCCH is transmitted in the corresponding subframe.

Accordingly, configuring the CSS resource region and the USS resource region of the MTC device 100 not to overlap with each other may help a smooth operation of the MTC device 100. Hereinafter, a scheme that configures the CSS resource region and the USS resource region not to overlap with each other will be described in more detail.

As a first scheme, the subframes may be distinguished and used by in order to prevent the CSS resource region and the USS resource region from overlapping with each other. In detail, a location of the subframe where the CSS area for the MTC device is present and a location of the subframe where the USS area is present may be separated and used. That is, the location of the subframe where the CSS may be present and the location of the subframe where the USS may be present may be separated. Alternatively, only the CSS area or only the USS area may be present for the MTC device in the specific subframe. Therefore, the MTC device may recognize that only one of the CSS and the USS is present in the specific subframe. Therefore, the MTC device may blind-decode only one of the CSS and the USS in the specific subframe. Further, alternatively, a location of a subframe where the cell specific PDCCH for the MTC device and a location of a subframe where the MTC device specific (alternatively, UE specific) PDCCH may be transmitted may be separated. Accordingly, the MTC device may assume that only one of the cell specific PDCCH and the MTC device specific PDCCH is received in the specific subframe. In this case, it may be assumed that the MTC device specific (alternatively, UE specific) PDCCH is not transmitted through the CSS area. Information on the locations the separated subframes (that is, the subframes separated into the CSS and the USS or the subframes distinguished and separated into the cell common PDCCH and the MTC specific PDCCH) may be defined in advance, notified to the MTC device through the SIB, or notified to the MTC device through a higher layer signal.

As a second scheme, CCE resources may be distinguished and used in order to prevent the CSS resource region and the USS resource region from overlapping with each other. In detail, the CCE (alternatively, REG or RE) resource where the MTC device specific (alternatively, UE specific) PDCCH is transmitted may be designated differently from the CCE (alternatively, REG or RE) resource where the cell specific PDCCH is transmitted. To this end, the CSS area and the USS area may be designated as different CCEs in the subframe. Alternatively, the CCE resource which may be configured as the CSS and the CCE resource which may be configured as the USS may be distinguished from each other.

To this end, the CCE resource where the MTC device specific (alternatively, UE specific) PDCCH may be transmitted may be obtained by an equation given below.

$$L\{(Y_k+m') \mod \lfloor N_{CCE,k}/L \rfloor\}+i \quad \text{[Equation 1]}$$

In this case, a value of $Y_k$ may be used while being fixed to not 0 but a specific value. Accordingly, the MTC device may assume that the MTC device specific (alternatively, UE specific) PDCCH is not transmitted through the CSS area. In this case, such a technique may be effectively applied only when a downlink system bandwidth of the cell is large as a predetermined value or more or when the number of CCEs is large as a predetermined value or more. Alternatively, the CCE (alternatively, REG or RE) resource constituting the USS may be continuously designated differently from the CCE (alternatively, REG or RE) resource constituting the CSS. Similarly even in this case, the CCE resource constituting the MTC device specific (alternatively, UE specific) search space may be obtained as shown in the equation given above and a value of $Y_k$ may be used while being fixed to not 0 but a specific value.

As a third scheme, when the CSS resource region and the USS resource region overlap with each other, the MTC device may preferably monitor any one and drop the other one. As the third scheme, a first embodiment in which the MTC device preferentially monitors the CSS resource region and drops the USS resource region and a second embodiment in which the MTC device preferentially monitors the USS resource region and drops the CSS resource region may be available.

According to the first embodiment of the third scheme, when some or all of the CCE (alternatively, REG or RE) resources of the USS area and the CSS area for the MTC device overlap with each other, the MTC device may assume that the USS is not present and only the CSS is present in the corresponding subframe. Accordingly, when a part or the entirety of the CSS resource region and a part or the entirety of the USS resource region overlap with each other in the specific subframe, the MTC device may not blind-decode but drop the USS area in the corresponding subframe. For example, when the PDCCH for the MTC device is transmitted through the plurality of subframes as illustrated in FIG. 17, in the case where a part or the entirety of the USS area and a part or the entirety the CSS area overlap with each other in a specific subframe in which the PDCCH needs to be transmitted, the MTC device may determine that data is not transmitted to the MTC device through the USS area in the corresponding subframe.

To this end, when some or all of the CCE (alternatively, REG or RE) resources of the USS area and the CSS area for the MTC device overlap with each other, the MTC device specific (UE specific) PDCCH may not be transmitted in the corresponding subframe. Accordingly, when a part or the entirety of the CSS resource region and a part or the entirety of the USS resource region overlap with each other in the specific subframe, the MTC device may assume that the MTC device specific (UE specific) PDCCH is not transmitted to the MTC device from the base station in the corresponding subframe. For example, when the PDCCH for the MTC device is transmitted through the plurality of subframes as illustrated in FIG. 17, in the case where a part or the entirety of the USS area and a part or the entirety the CSS area overlap with each other in the specific subframe in which the PDCCH needs to be transmitted, the MTC device may determine that the MTC device specific (UE specific) PDCCH is not transmitted and only the cell specific PDCCH is transmitted to the MTC device from the base station in the corresponding subframe.

According to the second embodiment of the third scheme, when some or all of the CCE (alternatively, REG or RE) resources of the USS area and the CSS area for the MTC device overlap with each other in the specific subframe, the MTC device may assume that the USS is not present and only the CSS is present in the corresponding subframe. When the resource regions of the CSS and the USS overlap with each other in a subframe where the first type SIB (that is, SIB type 1) for the MTC device and a paging signal may be transmitted, the MTC device may assume that the CSS area is not present in the corresponding subframe.

Alternatively, when some or all of the CCE (alternatively, REG or RE) resources of the USS area and the CSS area for the MTC device overlap with each other in the specific subframe, the MTC device may determine that the cell specific PDCCH is not transmitted and only the MTC device specific (UE specific) PDCCH may be transmitted in the corresponding subframe.

Meanwhile, when some or all of the CCE (alternatively, REG or RE) resources of the USS area and the CSS area for the MTC device overlap with each other in the specific subframe, the first embodiment or the second embodiment of the third scheme may be selectively applied according to the subframe. For example, in the subframe where the first type SIB (that is, SIB type 1) and/or the paging signal may be transmitted to the MTC device, the technique of the second embodiment may be applied and in residual subframes, the technique of the second embodiment may be applied.

On the other hand, in the subframe (that is, a subframe where the first type SIB (that is, SIB type 1) or other SIBs may be transmitted) where the PDCCH masked with the SI-RNTI may be transmitted, the MTC device may assume that the USS is not present and only the CSS is present. That is, in the subframe (that is, the subframe where the first type SIB (that is, SIB type 1) or other SIBs may be transmitted) where the PDCCH masked with the SI-RNTI may be transmitted, the base station may not transmit the PDCCH to the MTC device through the USS area. Herein, the SI-RNTI may be substituted with the other one and for example, when an RNTI for the CE MTC device to receive is defined as 'MTC SI-RNTI', the aforementioned SI-RNTI may mean the MTC SI-RNTI.

Alternatively, in the subframe (that is, the subframe where the first type SIB or other SIBs may be transmitted) where the PDCCH masked with the SI-RNTI may be transmitted, the MTC device may assume that the MTC device specific (UE specific) PDCCH is not transmitted. To this end, in the subframe (that is, the subframe where the first type SIB or other SIBs may be transmitted) where the PDCCH masked with the SI-RNTI may be transmitted, the base station does not transmit the MTC device specific (UE specific) PDCCH to the MTC device.

Alternatively, when some or all of the CCE (alternatively, REG or RE) resources of the USS area and the CSS area for the MTC device overlap with each other in the subframe (that is, the subframe where the first type SIB or other SIBs may be transmitted) where the PDCCH masked with the SI-RNTI may be transmitted, the MTC device specific (UE specific) PDCCH may not be transmitted in the corresponding subframe. Accordingly, when a part or the entirety of the CSS resource region and a part or the entirety of the USS resource region of the MTC device overlap with each other in the subframe (that is, the subframe where the first type SIB or other SIBs may be transmitted) where the PDCCH masked with the SI-RNTI may be transmitted, the MTC device may not blind-decode the USS area in the corresponding subframe. As another method, when some or all of the CCE (alternatively, REG or RE) resources of the USS area and the CSS area for the MTC device overlap with each other in the subframe (that is, the subframe where the first type SIB or other SIBs may be transmitted) where the PDCCH masked with the SI-RNTI may be transmitted, the MTC device may assume that the CSS is not present and only the USS is present in the corresponding subframe.

Alternatively, when some or all of the CCE (alternatively, REG or RE) resources of the USS area and the CSS area for the MTC device overlap with each other in the subframe (that is, the subframe where the first type SIB or other SIBs may be transmitted) where the PDCCH masked with the SI-RNTI may be transmitted, the MTC device may assume that the CSS is not present and only the USS is present in the corresponding subframe. Accordingly, when a part or the entirety of the CSS resource region and a part or the entirety of the USS resource region of the MTC device overlap with each other in the subframe (that is, the subframe where the first type SIB or other SIBs may be transmitted) where the PDCCH masked with the SI-RNTI may be transmitted, the MTC device may assume that the MTC device specific PDCCH is not transmitted to the MTC device in the corresponding subframe. As yet another method, when some or all of the CCE (alternatively, REG or RE) resources of the USS area and the CSS area for the MTC device overlap with each other in the subframe (that is, the subframe where the first type SIB or other SIBs may be transmitted) where the PDCCH masked with the SI-RNTI may be transmitted, the MTC device specific (UE specific) PDCCH may assume that the cell specific PDCCH is not transmitted and only the MTC device specific (UE specific) may be transmitted in the corresponding subframe.

Alternatively, in order to prevent a problem that the CCE resources of the USS area and the CSS area for the MTC device from overlapping with each other in the specific subframe, the MTC device may assume that the CSS area is present only in the PDCCH and the USS area is present only in the EPDCCH. That is, the CSS area for the MTC device may be present only in the PDCCH and the USS area may be present only in the EPDCCH. Alternatively, the MTC device may assume that the cell specific PDCCH is transmitted only through the PDCCH and the MTC device specific (UE specific) PDCCH may be transmitted may be transmitted only through the EPDCCH. To this end, the base station may transmit the cell specific PDCCH for the MTC device only through the PDCCH and transmit the MTC device specific (UE specific) PDCCH only through the EPDCCH.

Figure 18:
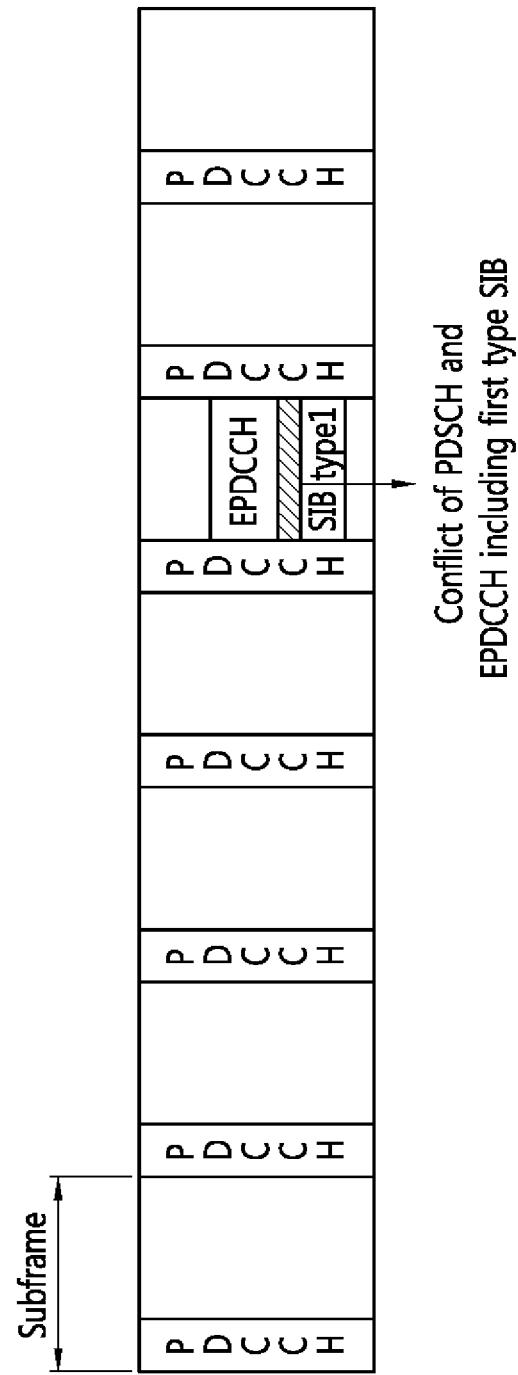
FIG. 18 illustrates an example in which the PDSCH including the first type system information block and the ePDCCH overlap with each other.

FIG. 18 illustrates an example in which the PDSCH including the first type system information block and the ePDCCH overlap with each other on the same subframe or the PRB area.

As known with reference to FIG. 18, when the EPDCCH is used for the MTC device (alternatively, the first type SIB is scheduled without the PDCCH), transmission resources of the EPDCCH and the PDSCH including the first type SIB may conflict with each other. Hereinafter, a scheme for solving the conflict will be described.

As a first scheme, when the transmission resources of the EPDCCH and the PDSCH including the first type SIB (that is, SIB type 1) conflict with each other, the SIB may be preferred. For example, in the subframe where the PDSCH including the first type SIB (that is, SIB type 1) for the MTC device may be transmitted, the EPDCCH may be prevented from being transmitted. Alternatively, when a transmission RPB/RE resource of the EPDCCH for the MTC device and a transmission PRB/RE resource of the PDSCH including the first type SIB (that is, SIB type 1) conflict with each other in the specific subframe, the MTC device may assume that the EPDCCH is not transmitted in the corresponding subframe. Alternatively, when the transmission RPB/RE resource of the EPDCCH for the MTC device and the transmission PRB/RE resource of the PDSCH including the first type SIB (that is, SIB type 1) conflict with each other, the MTC device may assume that the EPDCCH is not transmitted in the corresponding subframe. To this end, the base station may puncture the EPDCCH in the corresponding PRB/RE resource and transmit only the PDSCH including the first type SIB (that is, SIB type 1).

As a first scheme, when the transmission resources of the EPDCCH and the PDSCH including the first type SIB (that is, SIB type 1) conflict with each other, the EPDCCH may be preferred. In detail, when the transmission RPB/RE resource of the EPDCCH for the MTC device and the transmission PRB/RE resource of the PDSCH including the first type SIB (that is, SIB type 1) conflict with each other, the MTC device may assume that the SIB is not transmitted in the corresponding subframe. Alternatively, when the transmission RPB/RE resource of the EPDCCH for the MTC device and the transmission PRB/RE resource of the PDSCH including the first type SIB (that is, SIB type 1) conflict with each other in the specific subframe, the MTC device may assume that the SIB is not transmitted in the corresponding subframe. To this end, the base station may puncture the PDSCH including the first type SIB (that is, SIB type 1) in the corresponding PRB/RE resource and transmit only the EPDCCH.

Hereinabove, the first type SIB (that is, SIB type 1) has been described, but the present invention may be similarly applied even to a case in which the paging signal is scheduled without the PDCCH and transmitted.

The aforementioned embodiments of the present invention can be implemented through various means. For example, the embodiments of the present invention can be implemented in hardware, firmware, software, combination of them, etc. Details thereof will be described with reference to the drawing.

Figure 19:
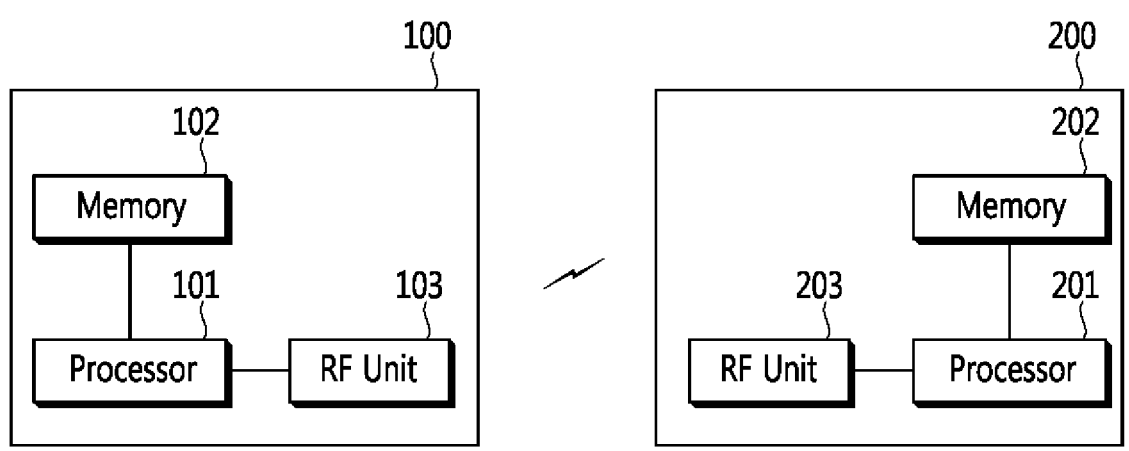
FIG. 19 is a block diagram illustrating a wireless communication system in which an embodiment of the present invention is implemented.

FIG. 19 is a block diagram illustrating a wireless communication system according to an embodiment of the present invention.

The base station (BS) includes processor, memory 202, and radio frequency (RF) unit 203. The memory 202 coupled with the processor 201 stores a variety of information for driving the processor 201. The RF unit 203 coupled to the processor 201 transmits and/or receive radio signals. The processor 201 implements the proposed functions, procedures, and/or methods. In the aforementioned embodiment, an operation of the BS may be implemented by the processor 201.

The MTC device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for receiving a downlink control channel, the method performed by a device and comprising:
   monitoring the downlink control channel within a common search space (CSS) or a machine type communication (MTC) specific search space;
   receiving downlink control information (DC), which is repeated over a first plurality of downlink subframes, via the downlink control channel;
   receiving a system information block (SIB) with a periodicity of 80 ms,
   wherein the SIB includes information dedicated for the device and is repeatedly received over a second plurality of downlink subframes within the 80 ms;
   based on that at least one first downlink subframe, among the first plurality of downlink subframes, is used to receive the SIB, determining that the DCI via the downlink control channel is not transmitted on the at least one downlink subframe,
   wherein the CSS includes a first CSS and a second CSS, based on a coverage enhancement (CE) mode; and
   decoding the DCI across the first plurality of downlink subframes between the SIB intervals within the search spaces of the second CSS and the MTC specific search space, based on the CE mode.

2. The method of claim 1, wherein the at least one first downlink subframe includes an overlapped downlink subframe between the first plurality of downlink subframes and the second plurality of downlink subframes.

3. The method of claim 1, wherein the SIB is a new SIB type 1 dedicated for the device and different from a legacy SIB type 1.

4. The method of claim 1, wherein the device is configured with a coverage enhancement.

5. The method of claim 1, wherein the downlink control channel includes at least one of a physical downlink control channel (PDCCH) and an enhanced physical downlink control channel (ePDCCH).

6. The method of claim 1, further comprising:
   determining a start subframe to receive the DCI via the downlink control channel.

7. The method of claim 1, further comprising:
   determining a start subframe to receive the SIB.

8. A device for receiving a downlink control channel, the device comprising:
   a transceiver; and
   a processor operatively connected to the transceiver and configured to:
   control the transceiver to monitor the downlink control channel within a common search space (CSS) or a machine type communication (MTC) specific search space,
   control the transceiver to receive downlink control information (DCI), which is repeated over a first plurality of downlink subframes, via the downlink control channel, and
   control the transceiver to receive a system information block (SIB) with a periodicity of 80 ms,
   wherein the SIB includes information dedicated for the device and is repeatedly received over a second plurality of downlink subframes within the 80 ms,
   wherein based on at least one first downlink subframe, among the first plurality of downlink subframes, is used to receive the SIB, the processor is configured to determine that the DCI via the downlink control channel is not transmitted on the at least one downlink subframe, and
   wherein the CSS includes a first CSS and a second CSS, based on a coverage enhancement (CE) mode, and
   control the transceiver to decode the DCI across the first plurality of downlink subframes between the SIB intervals within the search spaces of the second CSS and the MTC specific search space, based on the CE mode.

9. The device of claim 8, wherein the at least one first downlink subframe includes an overlapped downlink subframe between the first plurality of downlink subframes and the second plurality of downlink subframes.

10. The device of claim 8, wherein the SIB is a new SIB type 1 dedicated for the device and different from a legacy SIB type 1.

11. The device of claim 8, wherein the device is configured with a coverage enhancement.

12. The device of claim 8, wherein the downlink control channel includes at least one of a physical downlink control channel (PDCCH) and an enhanced physical downlink control channel (ePDCCH).

13. The device of claim 8, wherein the processor is further configured to:
   determine a start subframe to receive the DCI via the downlink control channel.

14. The device of claim 8, wherein the processor is further configured to:
   determine a start subframe to receive the SIB.

15. The device of claim 8, wherein the processor is configured to:
   stop receiving a physical downlink shared channel (PDSCH) signal including a downlink data other than the SIB in the second plurality of downlink subframes used for receiving the SIB.

16. The method of claim 1, further comprising:
   stop receiving a physical downlink shared channel (PDSCH) signal including a downlink data other than the SIB in the second plurality of downlink subframes used for receiving the SIB.

* * * * *